United States Patent
Yagi et al.

(10) Patent No.: US 8,902,290 B2
(45) Date of Patent: Dec. 2, 2014

(54) PORTABLE APPARATUS AND MICROCOMPUTER

(75) Inventors: Hiroshi Yagi, Kanagawa (JP); Toshiaki Yamada, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 387 days.

(21) Appl. No.: 13/351,799

(22) Filed: Jan. 17, 2012

(65) Prior Publication Data

US 2012/0182393 A1    Jul. 19, 2012

(30) Foreign Application Priority Data

Jan. 19, 2011    (JP) .................................. 2011-008904

(51) Int. Cl.
*H04N 13/00*    (2006.01)

(52) U.S. Cl.
CPC .................................. *H04N 13/004* (2013.01)
USPC .......................................................... 348/46

(58) Field of Classification Search
CPC ......... H04N 5/00; H04N 13/00; H04N 5/232; H04N 5/23212; H04N 13/004; H04N 13/0239
See application file for complete search history.

(56) References Cited

U.S. PATENT DOCUMENTS 7,889,192 B2    2/2011 Konya et al.
2008/0273191 A1*    11/2008 Kim et al. .................... 356/4.01

FOREIGN PATENT DOCUMENTS

JP    6-30446 A    2/1994
JP    2004-40445 A    2/2004

* cited by examiner

*Primary Examiner* — Huy T Nguyen
(74) *Attorney, Agent, or Firm* — Miles & Stockbridge P.C.

(57) ABSTRACT

The data processing unit generates image data such that the camera unit is caused to acquire a plurality of data captured with a focal length changed in response to instructions for imaging operation by an operation unit and three-dimensional display data are generated from the plurality of captured data based on the correlation of focused images which are different according to the focal lengths of the acquired plurality of captured data with the focal length thereof. Since each of the plurality of data captured with a focal length changed is different in a focused image according to the focal length, the plurality of captured data is subjected to the processing for generating three-dimensional display data based on the correlation of a focused image different according to the focal length with the focal length to allow the three-dimensional display data to be generated.

20 Claims, 21 Drawing Sheets

(PROCESSING A)

(PROCESSING D)

(FOR THE CASE OF DOUBLE LCD PANELS)

☐ : BLOCK WHICH CANNOT BE MEASURED (BACKGROUND)

◻ : BLOCK WHICH CAN BE MEASURED (DISTANCE DETERMINED)

PORTABLE APPARATUS AND MICROCOMPUTER

CROSS-REFERENCE TO RELATED APPLICATIONS

The disclosure of Japanese Patent Application No. 2011-8904 filed on Jan. 19, 2011 including the specification, drawings and abstract is incorporated herein by reference in its entirety.

BACKGROUND

The present invention relates to a portable apparatus with a three-dimensional display function to three-dimensionally display captured data and a microcomputer for controlling the portable apparatus and to a technique effectively applicable to a digital camera, a cellular phone, and a portable apparatus with a camera, for example.

In a portable apparatus with a camera such as a cellular phone, there has been provided a technique in which captured data are used to three-dimensionally display the image thereof. In the present description, the three-dimensional display of an image is simply referred to as 3D display (three-dimensional display).

Japanese Unexamined Patent Publication No. Hei 06 (1994)-30446 discusses that a 3D image is produced by adding parallax information to data captured by using one camera to solve the problem that the use of two cameras for three-dimensional display increases cost and consumption power as well. Regarding the addition of the parallax information, components such as human eyes and nose are extracted from the captured image and the parallax information according to the extracted components is automatically or manually added. For this reason, an image processing program recognizes predetermined image components such as a face and a nose and can three-dimensionally display the part or three-dimensionally display the image components designated by a user on a monitor screen for the captured image.

Japanese Unexamined Patent Publication No. 2004-40445 discusses that an image receiving unit such as a pair of mirrors is arranged in opposition to each other, images reflected on the image receiving unit are captured by one swingably provided imaging means, and the left and the right image data with parallax are generated to perform the 3D display.

SUMMARY

In Japanese Unexamined Patent Publication No. Hei 06 (1994)-30446, the image processing program needs to recognize the predetermined image components such as a face and a nose to determine whether to three-dimensionally display the part or the user needs to designate the image components to be three-dimensionally displayed on the monitor screen for the captured image. In the former, the image processing program needs to recognize various image components, the more the objects to be recognized, the slower the data processing speed, which complicates a processing program and makes the scale excessive. In the latter, it is not possible to perform automation to complicate the operation.

In Japanese Unexamined Patent Publication No. 2004-40445, the swingable imaging means needs to be provided according to the arrangement of a pair of the image receiving unit and positioning control needs to be performed. Although two imaging means are not required, mechanical structure and control mechanism are complicated in configuration.

The present invention has a purpose to provide a portable apparatus allowing three-dimensional display and a microcomputer suited for the control of the three-dimensional display for the portable apparatus while scale and cost are suppressed in terms of mechanical structure and control.

The above and further object and novel features of the present invention will be apparent from the following description and appended drawings.

The typical invention among the inventions disclosed in the present description is briefly described below.

Image data are generated such that a camera unit is caused to acquire a plurality of data captured with a focal length changed in response to instructions for imaging operation by an operation unit and three-dimensional display data are generated from the plurality of captured data based on the correlation of focused images which are different according to the focal lengths of the acquired plurality of captured data with the focal length thereof.

The three-dimensional display data can be produced such that the plurality of captured data are turned into the three-dimensional display data based on the correlation of focused images which are different according to the focal length with the focal length thereof because each of the plurality of data captured with a focal length changed is different in a focused image according to the focal length.

The effect obtained by the typical invention among the inventions disclosed in the present description is briefly described below.

It is possible to perform the three-dimensional display while scale and cost are suppressed in terms of mechanical structure and control.

DETAILED DESCRIPTION

1. Brief Description of Embodiment

Figure 1:
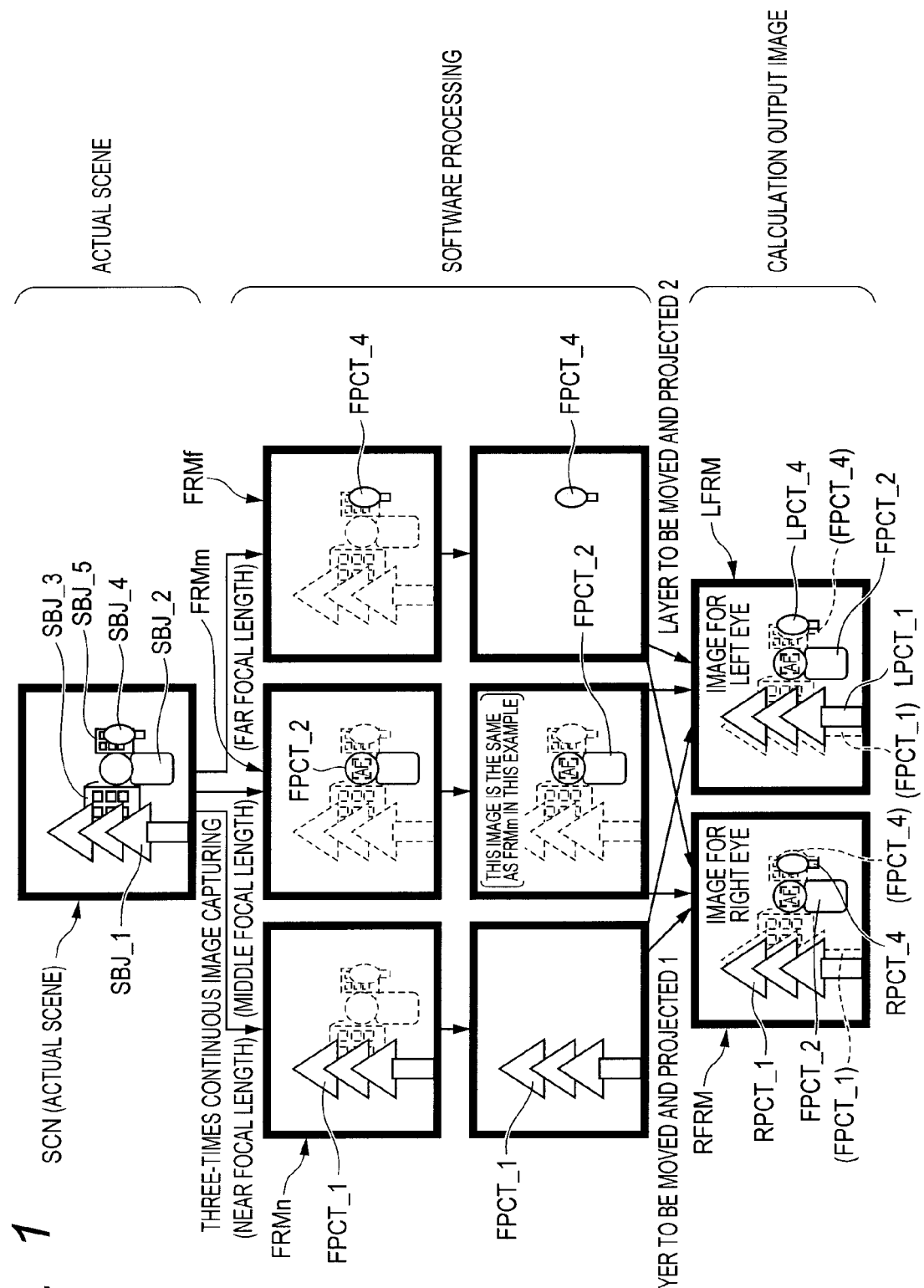
FIG. 1 shows a basic procedure for a three-dimensional display data processing being a data processing performed by a microcomputer for three-dimensionally displaying an image captured by a camera unit.

A typical embodiment of the invention disclosed in the description is briefly described below. Reference characters and numerals in figures parenthesized and referenced in the brief description of typical embodiments merely exemplify components included in the concept of the parenthesized components.

[1] (Generation of Three-Dimensional Display Data from Data Captured with a Focal Length Changed Based on Correlation with a Focal Length)

A portable apparatus (1) according to the typical embodiment of the present invention includes a camera unit (10), an operation unit (13), and a data processing unit (5). The data processing unit performs processing for causing the camera unit to acquire a plurality of data captured with a focal length changed in response to instructions for imaging operation by the operation unit and generating three-dimensional display data from the plurality of captured data based on the correlation of focused images (FPCT_1, FPCT_2, and FPCT_4) which are different according to the focal lengths of the acquired plurality of captured data with the focal length thereof.

Since each of the plurality of data captured with a focal length changed is different in a focused image according to the focal length, the plurality of captured data is subjected to the processing for generating three-dimensional display data based on the correlation of a focused image different according to the focal length with the focal length to allow the three-dimensional display data to be generated. Since the focused image is different from a non-focused image in degree of detection of an image boundary, an image can be detected or extracted according to the degree of detection, which eliminates the need for employing the processing for recognizing an image by a method such as a pattern matching such that the feature and contour of the image to be detected is previously registered, this simplifies the three-dimensional data processing, and data and program capacity do not need to be increased. Furthermore, neither a plurality of camera units needs to be prepared nor a complicated mechanical structure and a positioning control mechanism which are used for a swing positioning mechanism in the camera unit are required.

[2] (Generation of 3D Data from Data Captured with a Focal Length Changed Based on Correlation with Focal Length)

A portable apparatus (1) according to another embodiment of the present invention includes the camera unit (10), the operation unit (13), the data processing unit (5) for controlling the camera unit based on the operation of the operation unit and processing data captured by the camera unit, and a display unit (11) for performing three-dimensional display using image data generated by the data processing unit. The data processing unit causes the camera unit to acquire a plurality of data captured with a focal length changed in response to instructions for imaging operation by the operation unit, discriminates data of the focused images (FPCT_1, FPCT_2, and FPCT_4), data of non-focused images corresponding to the focused images, and data of a background image (BCKG) from which the focused images and the non-focused images are removed, from the acquired plurality of captured data, and generates data of three-dimensional display images for the right and left eyes (RFRM and LFRM) in which each of the focused images is combined with the background image with the focal length corresponding to the focused image reflected in the depth of the three-dimensional display.

Since each of the plurality of data captured with a focal length changed is different in a focused image according to the focal length, each focused image is combined with the background image with a distance to the focused image different according to the focal length reflected in the depth of the three-dimensional display to allow generating data of three-dimensional display images for the right and left eyes from the plurality of data captured with a focal length changed according to instructions as to imaging operation. Since the focused image is different from a non-focused image in degree of detection of an image boundary, an image can be detected or extracted according to the degree of detection, which eliminates the need for employing the processing for recognizing an image by a method such as a pattern matching such that the feature and contour of the image to be detected is previously registered, this simplifies the three-dimensional data processing, and data and program capacity do not need to be increased. Furthermore, neither a plurality of camera units needs to be prepared nor a complicated mechanical structure and a positioning control mechanism which are used as a swing positioning mechanism in the camera unit are required.

[3] (Focused and Non-focused)

In the portable apparatus in the above item [2], the data processing unit performs an edge detection and a color difference detection to take an image having a boundary high in detection rate as a focused image and an image having a boundary low in detection rate as a non-focused image.

The focused and non-focused images can be easily discriminately detected.

[4] (Designation Focus and Capture Position at Near and Far Focal Length Thereof)

In the portable apparatus in the above item [2], with the focal length designated by the operation of the operation unit as a center, the data processing unit instructs the camera unit to capture an image at a near focal length which is near to the camera unit by a predetermined focal length with respect to the center, at the center focal length, and at a far focal length which is far from the center by a predetermined focal length.

A three-dimensional image can be generated with an image to be captured as a center.

[5] (Capture Frequency at Near and Far Focal Length)

In the portable apparatus in the above item [4], the predetermined near focal length with respect to the center is a single or a plurality of focal lengths and the predetermined far focal length with respect to the center is a single or a plurality of focal lengths.

Although the kinds of the near and the far focal length are increased to increase a three-dimensional data processing time period, the presence of a three-dimensional image can be enhanced. On the other hand, the kinds of the near and the far focal length are decreased to decrease the presence of a three-dimensional image, however, the three-dimensional data processing time period can be reduced.

[6] (Order of Near, Center, and Far Focal Length Capture)

In the portable apparatus in the above item [4], the data processing unit captures a plurality of data with the focal length changed in the order of the near, the center, and the far focal length.

A direction at which the camera unit performs focusing can be limited to one direction. The operation direction of the camera unit does not need to be a reciprocal direction unlike a case where the camera unit performs focusing with the center as a reference point, so that the operation in which a plurality of data is acquired while a focal length is being changed can be made faster and stabler.

[7] (Lookup Table of Actual Distance Referenced in Amount of Movement)

In the portable apparatus in the above item [2], the data processing unit includes a lookup table (90) of an actual distance according to the amount of movement, which stores correspondence between the amount of movement in which the focus of focus position of the camera unit is moved and the actual distance, and acquires the focal length except the reference point related to the plurality of captured data acquired with the focal length changed based on the actual distance acquired from the lookup table based on the amount of movement of a focus with respect to the focus position of the reference point and the focal length of the focus position of the reference point when an image is captured with the focal length changed with the focus position as the reference point.

The focal lengths of plural captured data can be readily acquired.

[8] (Lookup Table of Amount of Displacement of Arrangement Referenced in Focal Length)

In the portable apparatus in the above item [7], the data processing unit includes a lookup table (91) of the amount of displacement of arrangement according to the focal length, which stores the correspondence of the amount of displacement of arrangement of a focused image in the left- and right-eye images with the focal length to determine a depth in which the focal length is reflected, and determines the arrangement of the focused images in the left- and right-eye images with reference to the lookup table according to the focal length.

The amount of displacement of arrangement according to the focal length can be readily acquired.

[9] (Competition of Same Focused Images (High Speed Moving Objects) Among Plural Image Data)

In the portable apparatus in the above item [2], when the focused images compete among a plurality of captured image data, the data processing unit combines the focused image of the captured data in which the focal length is shortest in the competing focused images with the background image.

The object moving to the direction at which the focal length of the captured data is changed probably becomes a focused image in each of a plurality of data captured with a focal length changed. In such a state, focused images compete with each other among the plurality of captured data, and one of the competing focused images is selected and needs to be combined with a background image. At this point, the focused image of captured data whose focal length is shortest is selected to allow a moving object to be three-dimensionally displayed so that the moving object can be prominently projected from the front.

[10] (Generation of Three-Dimensional Display Data from Data Captured with a Focal Length Changed Based on Correlation with Focal Length)

A portable apparatus (1) according to still another embodiment of the present invention includes the camera unit (10), the operation unit (13), the data processing unit (5) for controlling the camera unit based on the operation of the operation unit and processing data captured by the camera unit, and a display unit (11) for performing three-dimensional display using the image data generated by the data processing unit. The data processing unit causes the camera unit to acquire a plurality of data captured with a focal length changed in response to instructions for imaging operation by the operation unit, discriminates data of focused images (FPCT_1, FPCT_2, and FPCT_4), data of non-focused images corresponding to the focused images, and data of a background image from which the focused images and the non-focused images are removed, from the acquired plurality of captured data, and generates data of three-dimensional display images for the right and left eyes (RFRM and LFRM) in which each of the focused images is combined with the background image with the focal length corresponding to the focused image reflected in the depth of the three-dimensional display.

The action similar to that in the above item [2] simplifies the three-dimensional data processing, and data and program capacity do not need to be increased. Furthermore, neither a plurality of camera units needs to be prepared nor a complicated mechanical structure and a positioning control mechanism which are used as a swing positioning mechanism in the camera unit are required.

[11] (Focused and Non-focused)

In the portable apparatus in the above item [10], the data processing unit performs an edge detection and a color difference detection to take an image having a boundary high in detection rate as a focused image and an image having a boundary low in detection rate as a non-focused image.

The focused and non-focused images can be easily discriminately detected.

[12] (Designation Focus and Capture Position at Near and Far Focal Length Thereof)

In the portable apparatus in the above item [10], with the focal length designated by the operation of the operation unit as a center, the data processing unit instructs the camera unit to capture an image at a near focal length which is near to the camera unit by a predetermined focal length with respect to the center, at the center focal length, and at a far focal length which is far from the center by a predetermined focal length.

A three-dimensional image can be generated with an image to be captured as a center.

[13] (Capture Frequency at Near and Far Focal Length)

In the portable apparatus in the above item [12], the predetermined near focal length with respect to the center is a single or a plurality of focal lengths and the predetermined far focal length with respect to the center is a single or a plurality of focal lengths.

Although the kinds of the near and the far focal length are increased to increase a three-dimensional data processing time period, the presence of a three-dimensional image can be enhanced. On the other hand, the kinds of the near and the far focal length are decreased to decrease the presence of a three-dimensional image, however, the three-dimensional data processing time period can be reduced.

[14] (Order of Near, Center, and Far Focal Length Capture)

In the portable apparatus in the above item [12], the data processing unit captures a plurality of data with the focal length changed in the order of the near, the center, and the far focal length.

A direction at which the camera unit performs focusing can be limited to one direction. The operation direction of the camera unit does not need to be a reciprocal direction unlike a case where the camera unit performs focusing with the center as a reference point, so that the operation in which a plurality of data is acquired while a focal length is being changed can be made faster and stabler.

[15] (Lookup Table of Actual Distance Referenced in Amount of Movement)

In the portable apparatus in the above item [10], the data processing unit includes a lookup table (90) of an actual distance according to the amount of movement, which stores correspondence between the amount of movement in which the focus of focus position of the camera unit is moved and an actual distance, and acquires the focal length except the reference point related to the plurality of captured data acquired with the focal length changed based on the actual distance acquired from the lookup table based on the amount of movement of a focus with respect to the focus position of the reference point and the focal length of the focus position of the reference point when an image is captured with the focal length changed with the focus position as the reference point.

The focal lengths of plural captured data can be readily acquired.

[16] (Lookup Table of Amount of Displacement of Arrangement Referenced in Focal Length)

In the portable apparatus in the above item [15], the data processing unit includes a lookup table (91) of the amount of displacement of arrangement according to the focal length, which stores the correspondence of the amount of displacement of arrangement of a focused image in the left- and right-eye images with the focal length to determine the amount of displacement of arrangement for the three-dimensional display of the focused image, and determines the arrangement of the focused images in the left- and right-eye images with reference to the lookup table according to the focal length.

The amount of displacement of arrangement according to the focal length can be readily acquired.

[17] (Competition of Same Focused Images (High Speed Moving Objects) Among Plural Image Data)

In the portable apparatus in the above item [10], when the focused images compete among a plurality of captured image data, the data processing unit combines the focused image of the captured data in which the focal length is shortest in the competing focused images with the background image.

An object moving to the direction at which the focal length of the captured data is changed may probably be turned into a focused image in each of plural captured images with the focal length changed. In such a situation, focused images compete among the plural captured images, and one of the competing focused images needs to be selected and combined with the background image. At this point, the focused image of the captured data in which the focal length is shortest is selected to allow a moving object to be three-dimensionally displayed so that the moving object can be prominently projected from the front.

[18] (Generation of Three-Dimensional Display Data from Data Captured with a Focal Length Changed Based on Correlation with Focal Length)

A microcomputer (5) according to still another embodiment of the present invention includes camera interfaces (77 and 78) for outputting control to the camera unit and inputting captured data, an input interface (76) for inputting operation instructions to the camera unit, and program processing units (70, 80, 81, 82, and 83) for generating the control output to the camera unit based on the input operation instructions and subjecting the captured data input from the camera interfaces to data processing. The program processing unit performs processing for acquiring a plurality of data captured with a focal length changed from the camera interface in response to the operation instructions from the input interface and generating three-dimensional display data from the plurality of captured data based on the correlation of focused images (FPCT_1, FPCT_2, and FPCT_4) which are different according to the focal lengths of the acquired plurality of captured data with the focal length thereof.

Since each of the plurality of data captured with a focal length changed is different in a focused image according to the focal length, the plurality of captured data is subjected to the processing for generating three-dimensional display data based on the correlation of a focused image different according to the focal length with the focal length to allow the three-dimensional display data to be generated. Since the focused image is different from a non-focused image in degree of detection of an image boundary, an image can be detected or extracted according to the degree of detection, which eliminates the need for employing the processing for recognizing an image by a method such as a pattern matching such that the feature and contour of the image to be detected is previously registered, this simplifies the three-dimensional data processing, and data and program capacity do not need to be increased. Furthermore, the use of the microcomputer neither needs for preparing a plurality of camera units nor needs for a complicated mechanical structure and a positioning control mechanism which are used for a swing positioning mechanism in the camera unit. Thus, a portable apparatus with an image capture function can be realized.

[19] (Generation of Three-Dimensional Display Data from Data Captured with a Focal Length Changed Based on Correlation with Focal Length)

A microcomputer (5) according to still another embodiment of the present invention includes camera interfaces (77 and 78) for outputting control to the camera unit and inputting captured data, an input interface (76) for inputting operation instructions to the camera unit, and program processing units (70, 80, 81, 82, and 83) for generating the control output to the camera unit based on the input operation instructions and subjecting the captured data input from the camera interfaces to data processing. The program processing unit acquires a plurality of data captured with a focal length changed from the camera interface in response to the operation instructions from the input interface and discriminates data of the focused images (FPCT_1, FPCT_2, and FPCT_4), data of non-focused image corresponding to the focused image, and data of a background image from which the focused image and the non-focused image are removed, from the acquired plurality of captured data, and generates data of three-dimensional display images for the right and left eyes in which each of the focused images is combined with the background image with the focal length corresponding to the focused image reflected in the depth of the three-dimensional display.

Since each of the plurality of data captured with a focal length changed is different in a focused image according to the focal length, each focused image is combined with the background image with a distance to the focused image different according to the focal length reflected in the depth of the three-dimensional display to allow generating data of three-dimensional display images for the right and left eyes from the plurality of data captured with a focal length changed according to instructions as to imaging operation. Since the focused image is different from a non-focused image in degree of detection of an image boundary, an image can be detected or extracted according to the degree of detection, which eliminates the need for employing the processing for recognizing an image by a method such as a pattern matching such that the feature and contour of the image to be detected is previously registered, this simplifies the three-dimensional data processing, and data and program capacity do not need to be increased. Furthermore, the use of the microcomputer neither needs for preparing a plurality of camera units nor needs for a complicated mechanical structure and a positioning control mechanism which are used for a swing positioning mechanism in the camera unit. Thus, a portable apparatus with an image capture function can be realized.

[20] (Generation of Three-Dimensional Display Data from Data Captured with a Focal Length Changed Based on Correlation with Focal Length)

A microcomputer (5) according to still another embodiment of the present invention includes camera interfaces (77 and 78) for performing control output to and captured data input to the camera unit, an input interface (76) for inputting operation instructions to the camera unit, and program processing units (70, 80, 81, 82, and 83) for generating the control output to the camera unit based on the input operation instructions and subjecting the captured data input from the camera interfaces to data processing. The program processing unit acquires a plurality of data captured with a focal length changed from the camera interface in response to the operation instructions from the input interface and discriminates data of the focused images (FPCT_1, FPCT_2, and FPCT_4), data of non-focused image corresponding to the focused image, and data of a background image from which the focused image and the non-focused image are removed, from the acquired plurality of captured data, and generates data of three-dimensional display images for the right and left eyes in which each of the focused images is combined with the background image with the focal length corresponding to the focused image reflected in the amount of displacement of arrangement for the three-dimensional display of the focused image.

The action similar to that in the above item [19] simplifies the three-dimensional data processing, and data and program capacity do not need to be increased. Furthermore, the use of the microcomputer neither needs for preparing a plurality of camera units nor needs for a complicated mechanical structure and a positioning control mechanism which are used for a swing positioning mechanism in the camera unit. Thus, a portable apparatus with an image capture function can be realized.

2. Detailed Description of Embodiment

The embodiment is described further in detail below.

First Embodiment

Figure 2:
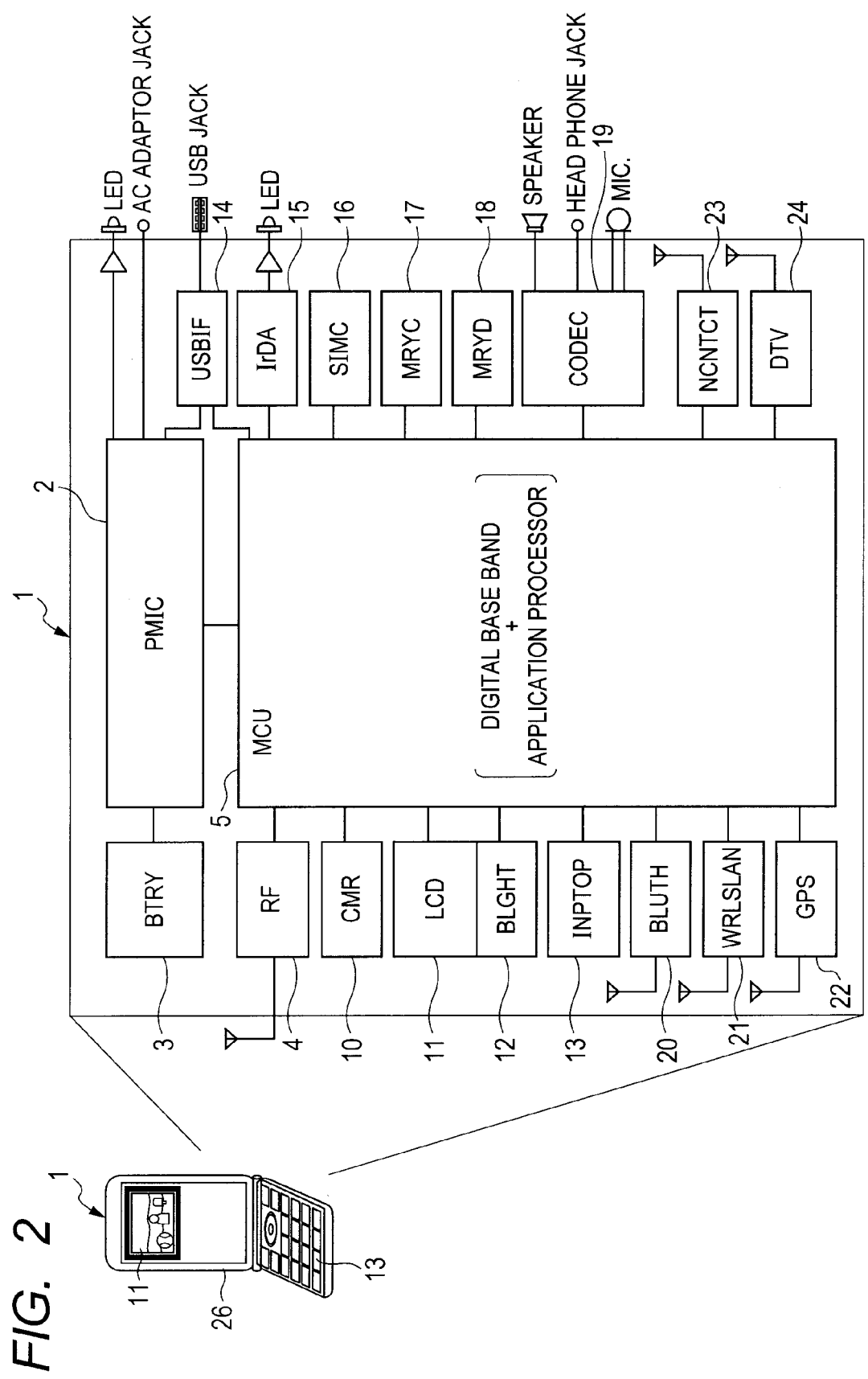
FIG. 2 shows a block diagram exemplifying a configuration of a cellular phone as a portable apparatus according to a first embodiment of the present invention.

FIG. 2 exemplifies a configuration of a cellular phone as a portable apparatus according to a first embodiment of the present invention. A cellular phone 1 is operated using the voltage of a battery (BTRY) 3 as an operation power-supply under a power-supply control by a power management unit (PMIC) 2. The cellular phone 1 includes a radio frequency unit (RF) 4 for mobile communication and a microcomputer (MCU) 5 for performing the baseband processing of transmission and reception signals by the radio frequency unit 4 and the control processing of other function units. The microcomputer (MCU) 5 is not limited in particular, but formed in one semiconductor substrate such as a single crystal silicon by a CMOS integrated circuit manufacturing technique or the microcomputer (MCU) 5 is comprised of multi-chips with the microcomputer 5 separated into a baseband processor unit and an application processor unit.

The cellular phone 1 includes other function units such as, for example, a camera unit (CMR) 10 with an auto focus (AF) function, a liquid crystal display panel (LCD) 11, a backlight unit (BLGHT) 12 used for the liquid crystal display panel 11, an input operation unit (INPTOP) 13 such as a key matrix or a touch panel, a USB interface connector (USBIFC) 14, an infrared communication unit (IrDA) 15, a security card slot (SIMC) 16 into which a security card such as an SIM is inserted (coupled), a memory card slot (MRYC) 17 into which a memory card is inserted (coupled), an external memory device (MRYD) 18 such as an SDRAM or a flash memory, an audio codec (CODEC) 19 coupled to a loudspeaker or a microphone, a Bluetooth communication unit (BLUTH) 20, a wireless LAN communication unit (WRLSLAN) 21, a global positioning system (GPS) 22, a proximal non-contact communication unit (NCNTCT) 23, and a digital terrestrial television tuner (DTV) 24. The liquid crystal display panel 11 is arranged so that the liquid crystal display panel 11 can be viewed from the outside of a casing 26. The operation panel of the input operation unit 13 is exposed from the casing 26.

Figure 3:
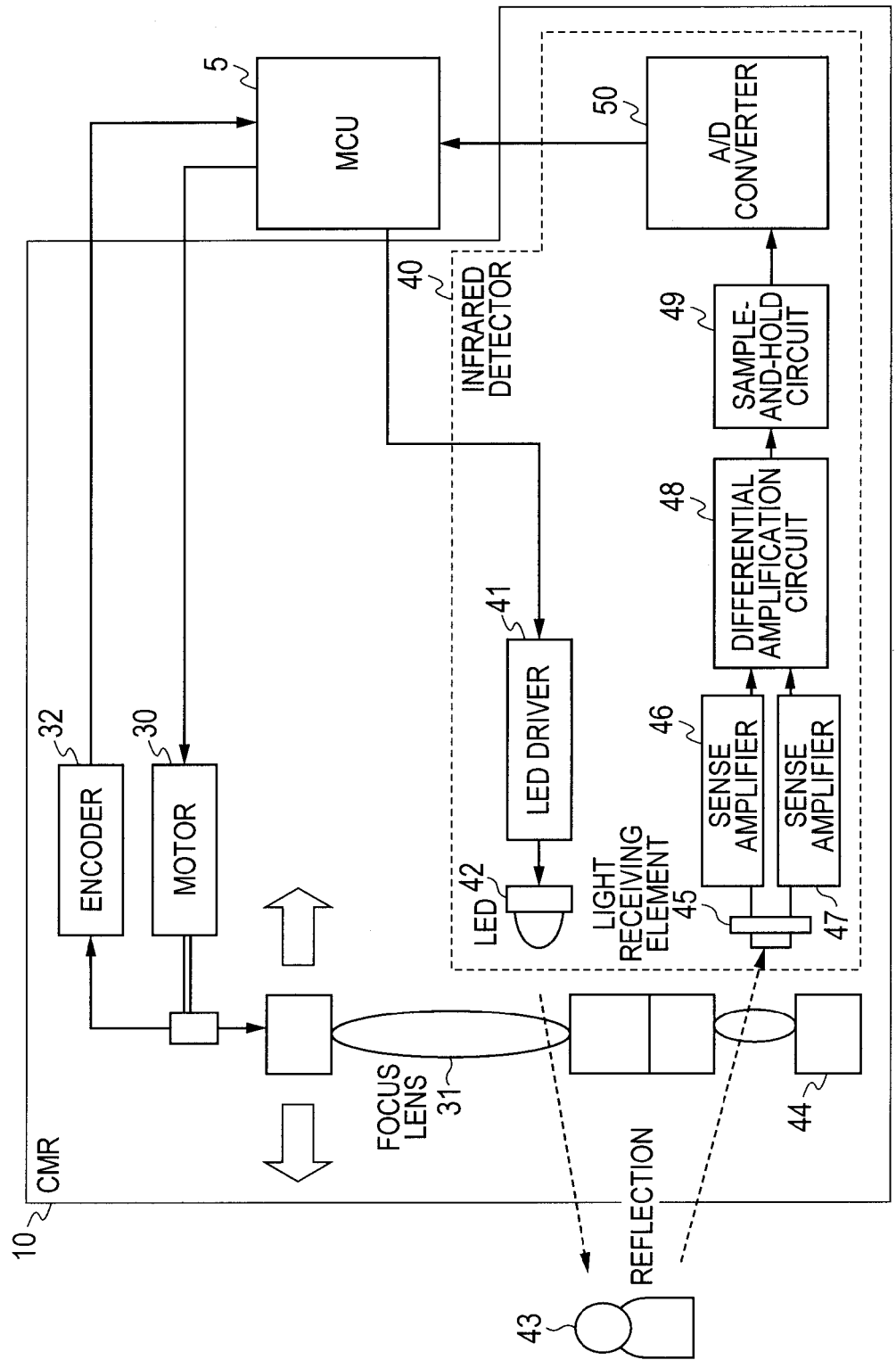
FIG. 3 shows a block diagram exemplifying a configuration of a camera unit in which the AF control of a focus lens is performed by an active method using phase detection.

FIG. 3 shows an example of a configuration of the camera unit 10. The camera unit 10 includes a focus lens 31 which is supported so that the focus lens 31 can be reciprocated in the focal depth direction by the driving force of a driving element 30. The position of the focus lens 31 is detected by an encoder 32. The AF control of the focus lens 31 is performed by an active method, for example, in which the microcomputer 5 uses an infrared detector 40. The infrared detector 40 irradiates a subject 43 with light from an LED 42 lit and driven by an LED driver 41 through the focus lens 31. The infrared detector 40 causes a light receiving element 45 to receive the reflected light through a light receiving lens 44, generates a differential photoelectric conversion signal, and causes sense amplifiers 46 and 47 to pre-amplify the photoelectric conversion signal. Thereafter, a detected signal in which the pre-amplified signal is amplified by a differential amplification circuit 48 is temporarily held by a sample-and-hold circuit 49. The held detected signal is sequentially converted to a digital signal by an A/D converter 50 and provided for the microcomputer 5. The microcomputer 5 determines a distance to the subject 43 corresponding to the return time of the reflected light based on the detected signal, drives the driving element 30 to match the focal length of the focus lens 31 to the determined distance, and confirms if the focus lens 31 is focused based on the strength of the detected signal. In the AF control of the microcomputer 5, the focal length at which the focus lens 31 is focused can be regarded as a distance to the subject 43 measured by using the infrared detector 40. The focal length is stored in a work memory of the microcomputer 5 or a memory area of the memory device 18 and used for data processing for three-dimensionally displaying images captured by the camera unit 10 (three-dimensional display data processing).

Figure 4:
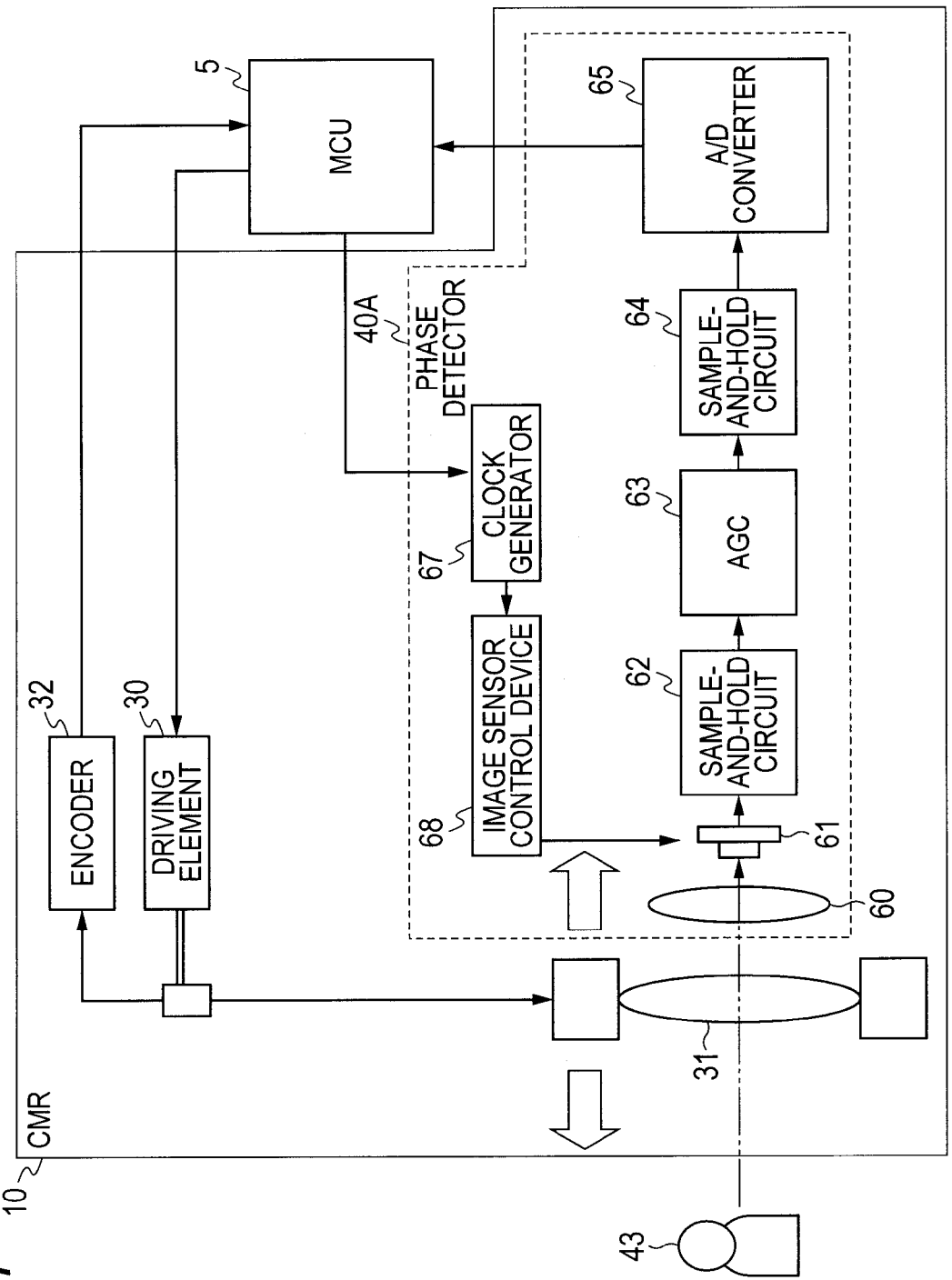
FIG. 4 shows a block diagram exemplifying a configuration of a camera unit in which the AF control of a focus lens is performed by a passive method using phase detection.

FIG. 4 exemplifies a configuration of a passive method in which the AF control of the focus lens 30 is performed by phase detection. In FIG. 4, a phase detector 40A is used instead of the infrared detector 40. The phase detector 40A separates light incident from the focus lens 31 into an imaging system and an AF system. The light separated into the AF system is led to the phase detector 40A. The phase detector 40A causes a separator lens 60 to separate the incident light and form two images on an imaging line sensor 61. The two image data imaged thereon are held by a sample-and-hold circuit 62. The phase detector 40A causes an automatic gain control (AGC) amplifier 63 to sequentially amplify the held data, a sample-and-hold circuit 64 to hold again the amplified data, an A/D converter 65 to sequentially convert the held detected signal to a digital signal and provides the digital signal for the microcomputer 5. The microcomputer 5 determines the direction and the amount of movement of focus position from a distance between the imaged two images based on the detected signal to perform the AF control. In the AF control of the microcomputer 5, the focal length at which the focus lens 31 is focused can be regarded as a distance to the subject 43 measured by using the infrared detector 40. The focal length is stored in a work memory of the microcomputer 5 or the memory device 18 and used for data processing for three-dimensionally displaying images captured by the camera unit 10 (three-dimensional display data processing). The imaging line sensor 61 performs a detection operation using charge transfer by the drive signal generated by an image sensor control device 68 in synchronization with the clock signal output from a clock generator 67.

Figure 5:
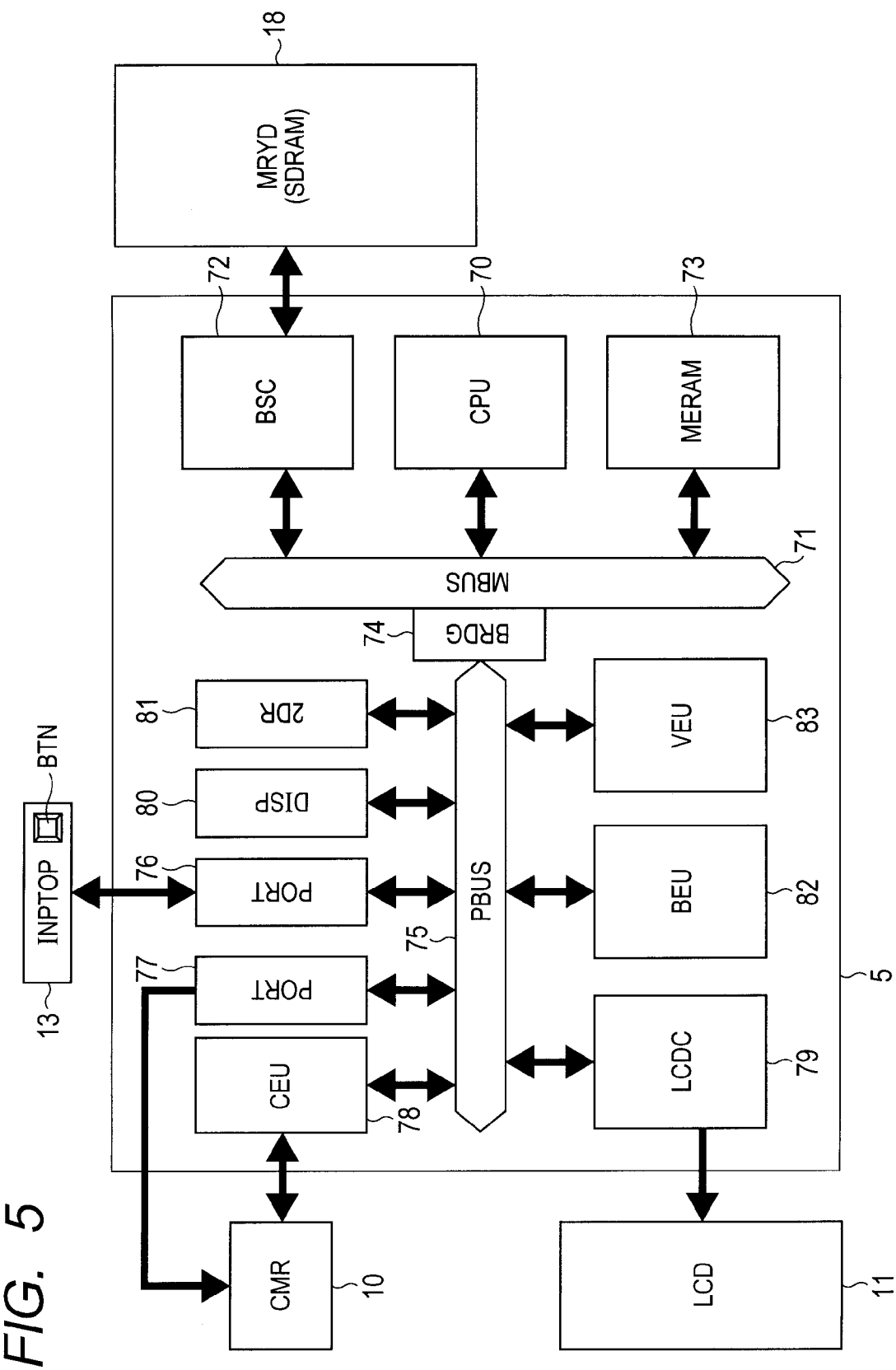
FIG. 5 is a block diagram showing a specific example of a microcomputer.

FIG. 5 shows a specific example of the microcomputer 5. The microcomputer 5 includes a central processing unit (CPU) 70 for executing a program, a bus state controller (BSC) 72 sharing a main bus (MBUS) 71 with the CPU 70, and an internal memory (MERAM) 73. The BSC 72 is coupled to a synchronous dynamic random access memory (SDRAM), for example, as the memory device (MRYD) 18, which is used as an area for storing the program for the CPU 70 and a data table used for data processing in the CPU 70. The internal memory 73 is used for the work area of the CPU 70.

The main bus 71 is coupled to a peripheral bus (PBUS) 75 via a bus bridge circuit (BRDG) 74. The peripheral bus 75 is coupled to an input/output port (PORT) 76 coupled to the input operation unit (INPTOP) 13, an input/output port (PORT) 77 coupled to the camera unit 10, a capture circuit (CEU) 78 coupled to the camera unit 10, a liquid crystal display control circuit (LCDC) 79 coupled to the liquid crystal display panel 11 and performing the display control thereof, a correction circuit (DISP) 80, a rotation processing circuit (2DR) 81, a blend processing circuit (BEU) 82, and a resize circuit (VEU) 83. The correction circuit (DISP) 80, the rotation processing circuit (2DR) 81, the blend processing circuit (BEU) 82, and the resize circuit (VEU) 83 are accelerators for processing image data based on instructions of the CPU 70. The correction circuit (DISP) 80 performs an image emphasis processing. The rotation processing circuit (2DR) 81 performs the rotation processing of an image using DMA transfer of image data. The blend processing circuit (BEU) 82 performs the superimposition processing of a plurality of images and colors. The resize circuit (VEU) 83 is a circuit for enlarging and reducing an image size.

Instructions for the AF operation, focus lock, and imaging operation to the camera unit 10 are provided for the input/output port (PORT) 76 by the operation of a button of the input operation unit 13. For example, depressing a shutter button BTN of the input operation unit 13 issues instructions for the start of the AF operation. The shutter button BTN being kept half-depressed issues instructions for a focus lock state in which a focal length in the AF operation is maintained. Further deeply depressing the shutter button BTN issues instructions for capturing an image. The input/output port (PORT) 76 is an example of an input interface for inputting operation instructions to the camera unit 10. A control signal for controlling the AF operation for capturing an image which the CPU 70 provides the camera 10 in response to focus lock and imaging instructions provided for the input/output port (PORT) 77 is output to the camera 10 from the input/output port (PORT) 77. Thereby, data captured by the camera unit 10 are captured by the capture circuit 78 from the camera 10. The input/output port (PORT) 77 and the capture circuit (CEU) 78 are examples of a camera interface for performing the control output and the imaging data input to the camera unit 10.

FIG. 1 exemplifies a basic procedure for a three-dimensional display data processing being a data processing performed by the microcomputer 5 for three-dimensionally displaying an image captured by the camera unit 10.

SCN denotes an actual scene to be captured and includes subjects SBJ_1 to SBJ_5, for example. The camera unit acquires a plurality of data captured with a focal length changed in the actual scene SCN. Here, an example is taken in which images are captured at focal lengths at which the camera unit is focused at both far and near distance with respect to a focal length at which the camera unit is focused on the subject SBJ_2 in the actual scene SCN in the AF operation. There are acquired data of a captured image FRMm captured at a middle distance at the focal length at which the camera unit is focused in the AF operation, a captured image FRMf captured at a distance far from the middle distance, and a captured image FRMn captured at a distance near to the camera unit. The contour of subjects except the subjects on which the camera unit is focused in the captured images is blurred. Images are captured while the focal lengths of the camera unit 10 are being changed from near, middle, and far distance (or far, middle, and near, or an order different therefrom) separate subjects into the ones on which the camera unit 10 is focused and the ones on which the camera unit 10 is not focused. For example, a focused image in the captured image FRMm captured at a middle distance is the FPCT_2. A focused image in the captured image FRMn captured at a near distance is the FPCT_1. A focused image in the captured image FRMf captured at a far distance is the FPCT_4.

In the three-dimensional display data generation processing, the three-dimensional display data are generated from the plurality of captured data based on the correlation of a focused image different according to focal lengths of the acquired plurality of captured data with the focal lengths.

More specifically, the focused images FPCT_1, FPCT_2, and FPCT_4 and the non-focused images corresponding thereto are extracted from the respective captured images by edge detection and contrast detection, for example. The focused image extracted in one captured image is a non-focused image corresponding to the focused image in the other captured image. For example, when the FPCT_1 is a focused image in the captured image FRMn, the image of the subject SBJ_1 is a non-focused image corresponding to the focused image FPCT_1 in the other focused images FRMf and FRMm. The images corresponding to subjects SBJ_3 and SBJ_5 excluding the subjects SBJ_1, SBJ_2, and SBJ_4 corresponding to all extracted focused images FPCT_1, FPCT_2, and FPCT_4 respectively form backgrounds included in the background image. The focused images are the image FPCT_2 having a focal length at a middle distance, the image FPCT_1 having a focal length at a near distance, and the image FPCT_4 having a focal length at a far distance. In the three-dimensional display data processing, the focused image, the non-focused image, and the background image are discriminated therebetween. The image FPCT_2 having a focal length at a middle distance is taken as a center. Data of the right-eye image RFRM and the left-eye image LFRM are generated in which the focused images FPCT_1 and FPCT_4 at a near and a far distance respectively with respect to the image FPCT_2 are combined with the background image according to the amount of displacement of arrangement in which the depth of the three-dimensional display is reflected. The right-eye image RFRM has focused images RPCT_1 and RPCT_4 and the left-eye image LFRM has focused images LPCT_1 and LPCT_4. In order to easily understand a state of arrangement displacement between the focused images RPCT_1 and RPCT_4 (LPCT_1 and LPCT_4) after the composition and the focused images FPCT_1 and FPCT_4 before the composition in the right-eye image RFRM (the left-eye image RFRM), the positions of the focused images FPCT_1 and FPCT_4 before the composition which do no actually exist after the composition are also illustrated as a reference.

Figure 6:
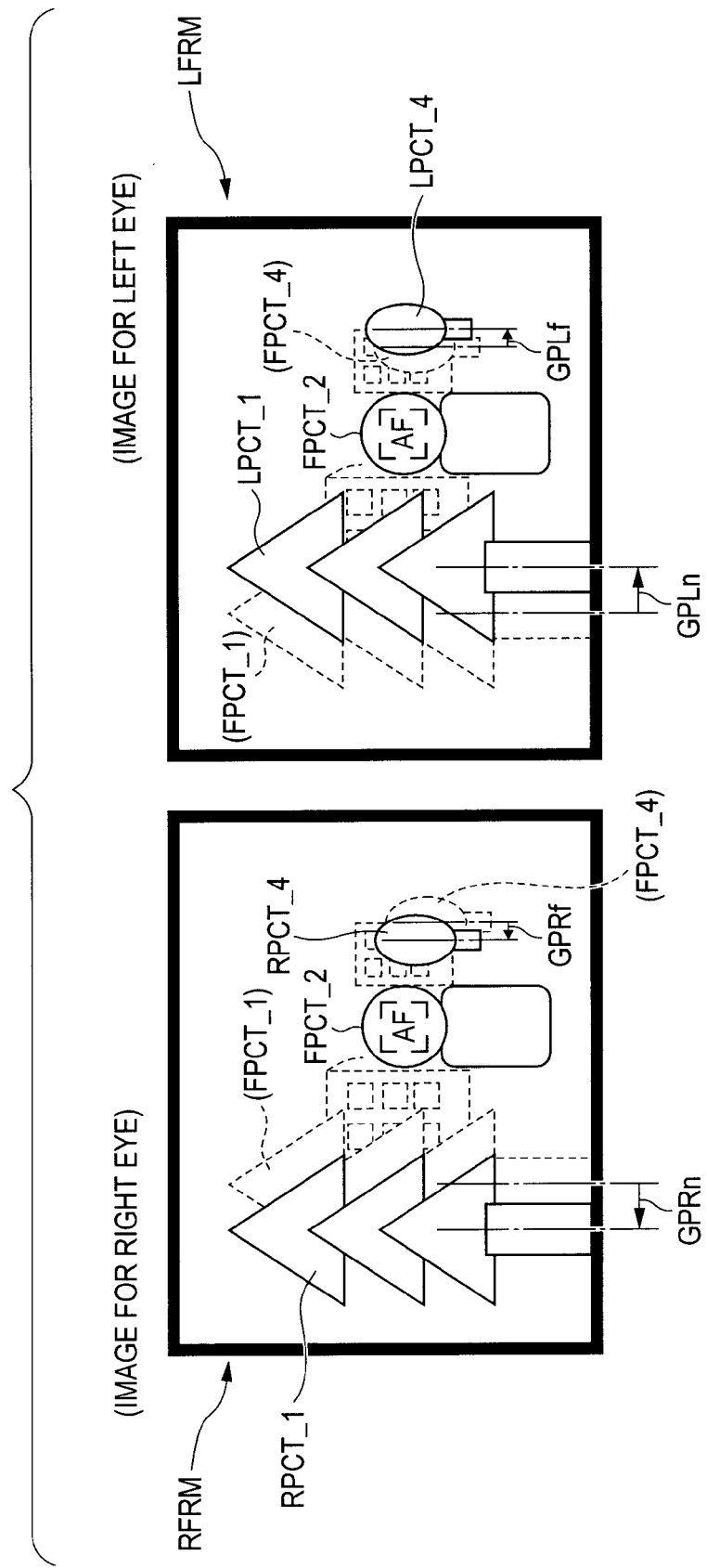
FIG. 6 exemplifies the amount of displacement of arrangement between the focused images before and after a background image is combined with focused images, in correspondence with FIG. 1.

FIG. 6 exemplifies the amount of displacement of arrangement between the focused images before and after the background image is combined with the focused images, in correspondence with FIG. 1.

The amount of displacement of arrangement between the near-distance focused image FPCT_1 and the focused image RPCT_1 after the composition in the right-eye image RFRM is denoted by GPRn. The amount of displacement of arrangement between the far-distance focused image FPCT_4 and the focused image RPCT_4 after the composition in the right-eye image RFRM is denoted by GPRf. The amount of displacement of arrangement between the near-distance focused image FPCT_1 and the focused image LPCT_1 after the composition in the left-eye image LFRM is denoted by GPLn. The amount of displacement of arrangement between the far-distance focused image FPCT_4 and the focused image LPCT_4 after the composition in the left-eye image LFRM is denoted by GPLf. The amount of displacement of arrangement is different according to the focal length of an image. For example, the shorter a focal length according to a distance from a subject to the camera unit 10, the greater the amount of displacement of arrangement. For this reason, the amount of displacement of arrangement is acquired by obtaining the focal lengths in acquiring the focused images FPCT_1, FPCT_2, and FPCT_4. More specifically, the focal length of the middle-distance focused image FPCT_2 is obtained by the AF control. With this focal length as a reference, there are acquired the near-distance focused image FPCT_1 in which a focal length is reduced by a predetermined distance, the far-distance focused image FPCT_4 in which a focal length is increased by a predetermined distance, and the middle-distance focused image FPCT_2 in which the focal length is obtained by the AF control. The focal length of the near-distance focused image is acquired such that an actual distance being change in an actual focal length is calculated from the amount of movement (or the amount of drive) of an optical system in moving the focus of focus position of the camera 10 to the direction near to the camera and the focal length obtained by the AF control for capturing the middle-distance focused image is added to the calculated actual distance. The focal length of the far-distance focused image is acquired such that an actual distance being change in an actual focal length is calculated from the amount of movement (or the amount of drive) of an optical system in moving the focus of focus position of the camera 10 to the direction far the camera and the focal length obtained by the AF control for capturing the middle-distance focused image is added to the calculated actual distance. It may be determined how much amount of displacement of arrangement is provided according to the focal length in accordance with an appropriate three-dimensional image algorism in consideration of the size of a display image and the required degree of three-dimension. An absolute value equal to the amount of displacement of arrangement may be set between the images for the left and right eyes or the absolute value may be varied to obtain a required display characteristic.

Figure 7:
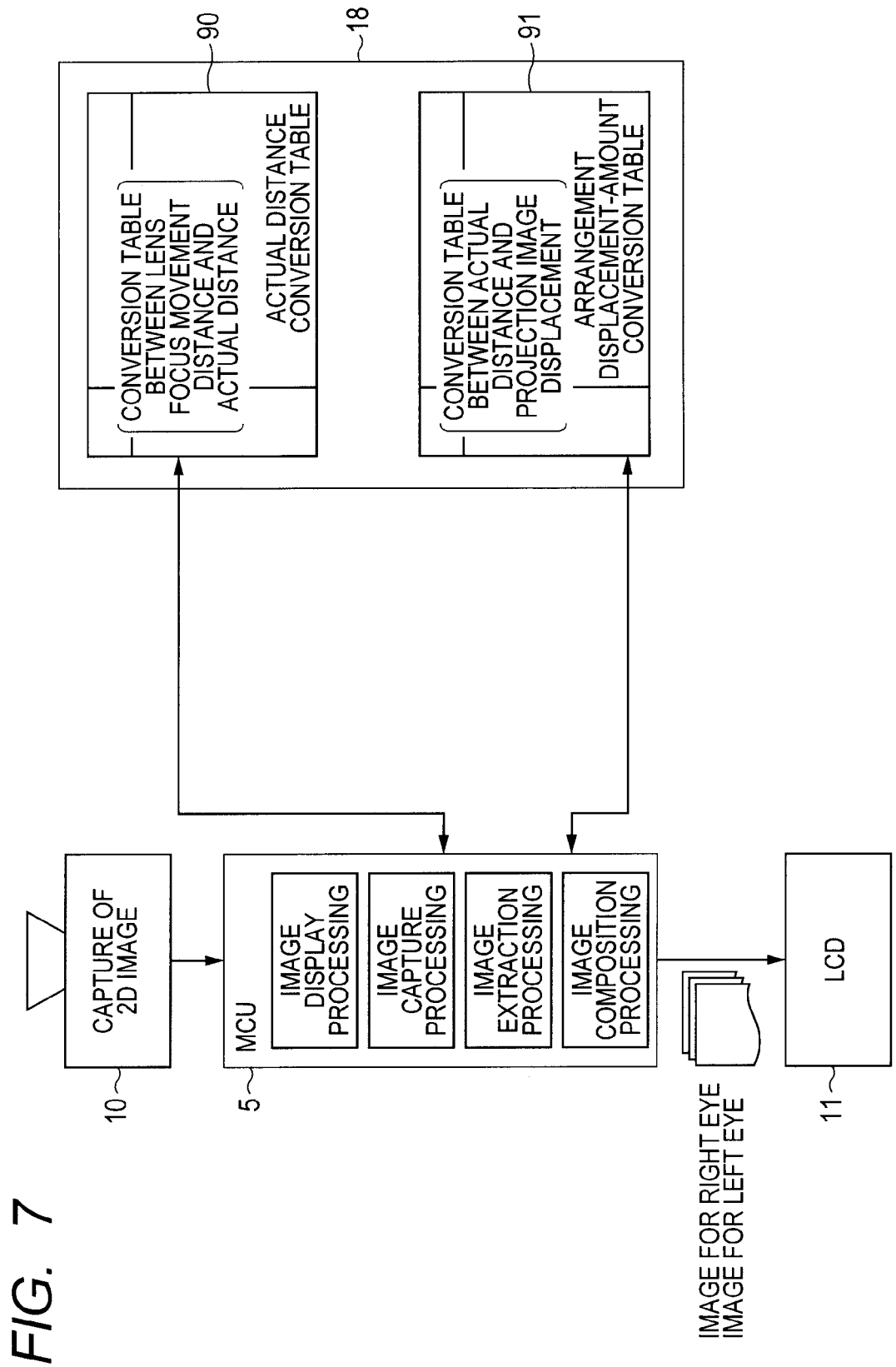
FIG. 7 is a block diagram showing an example of system configuration in which a look-up table is used to acquire the actual distance and the amount of displacement of arrangement described in FIG. 1.

FIG. 7 shows an example in which a look-up table is used to acquire the actual distance and the amount of displacement of arrangement described in FIG. 1. An actual distance conversion table 90 in FIG. 7 is used to acquire an actual distance being change in an actual focal length from the amount of movement (or the amount of drive) of the optical system of the camera 10. An arrangement displacement-amount conversion table 91 in FIG. 7 is used to acquire the amount of displacement of arrangement from the focal length of a focused image.

The actual distance conversion table 90 forms a look-up table of the amount of movement versus the actual distance which stores the correspondence of the amount of movement in moving the focus of the focus position of the camera 10 to the actual distance. When an image is captured with the focal length changed with the focus position of the middle-distance focused image as a reference point, the microcomputer 5 acquires the actual distance obtained from the actual distance conversion table 90 based on the amount of movement of the focus with respect to the focus position of the reference point and the focal lengths of the far- and near-distance focused images captured with the focal length changed based on the focal length of the middle-distance focused image. This enables easily acquiring the focal lengths of their respective focused images in the plurality of captured data to reduce the burden of calculation processing of the CPU 70.

The arrangement displacement-amount conversion table 91 forms a look-up table which stores the correspondence of the amount of displacement of arrangement of the focus image to the focal length. The microcomputer 5 refers to the amount of displacement of arrangement from the arrangement displacement-amount conversion table 91 based on the focal length to determine the arrangement of the focused image in the images for the left and right eyes with respect to the middle-distance focused image. This enables easily acquiring the amount of displacement of arrangement to reduce the burden of calculation processing of the CPU 70.

Figure 8:
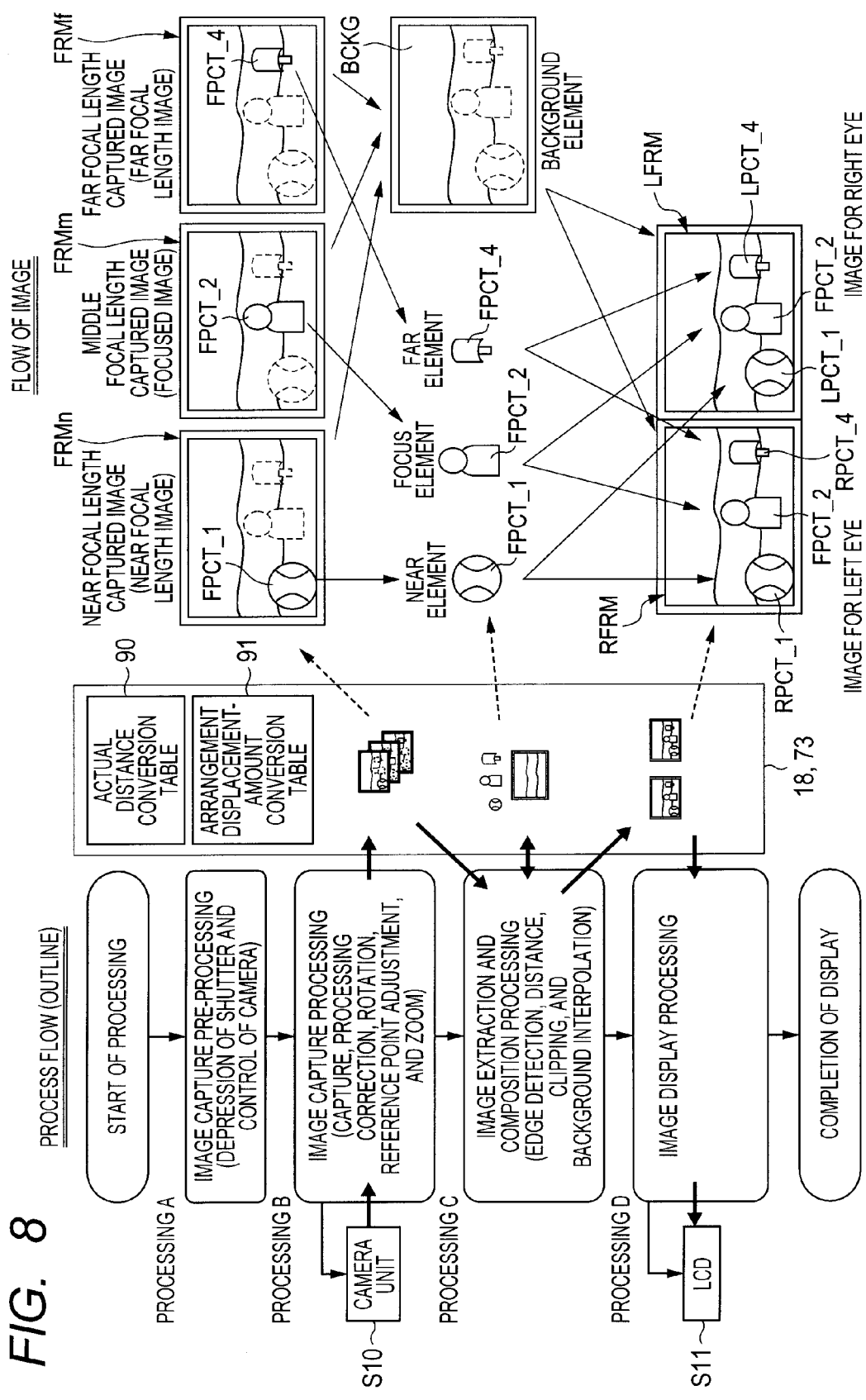
FIG. 8 is a schematic diagram for exemplifying further in detail the three-dimensional display data processing of the image captured by the camera unit.

FIG. 8 is a schematic diagram for exemplifying further in detail the three-dimensional display data processing of the image captured by the camera unit 10 and illustrates images corresponding to the processing flow by the microcomputer. An actual scene differs from the one in FIG. 1. For the convenience of description, the reference characters are regarded to be the same as those in FIG. 1 in the following description. FIG. 8 is similar to FIG. 1 in that the focal length is acquired by the AF control with respect to the middle-distance captured image (focus image) FRMm and the three-dimensional display data processing is performed using three two-dimensional captured data of the far-distance captured image (far image) FRMf captured at a distance far from the middle distance, the near-distance captured image (near image)

FRMn captured at a distance near to the camera unit, and the middle-distance captured image (focus image) FRMm in which the focal length is measured by the AF control. The focused image in the near image is referred to as a near element FPCT_1. The focused image in the focus image is referred to as a focus element FPCT_2. The focused image in the far image is referred to as a far element FPCT_4. The background image excluding the images corresponding to the near element FPCT_1, the focus element FPCT_2, and the far element FPCT_4 is referred to as a background element BCKG.

The three-dimensional display data processing in FIG. 8 is roughly divided into four parts: a pre-processing for capturing an image (processing A) such as the AF control in response to the depression of the shutter button; an image capture processing (processing B) for acquiring a plurality of data captured at the focal length determined by the AF control and focal lengths before and after the focal length; an image extraction and composition processing (processing C) in which data of the focused image, the non-focused image corresponding to the focused image, and the background image excluding the focused image and the non-focused image are discriminated from the plurality of captured data and data of three-dimensional display images for the right and left eyes (RFRM and LFRM) in which their respective focused images are combined with the background image with the focal length corresponding to the focused image reflected in the depth of the three-dimensional display are generated; and an image display processing (processing D).

Figure 9:
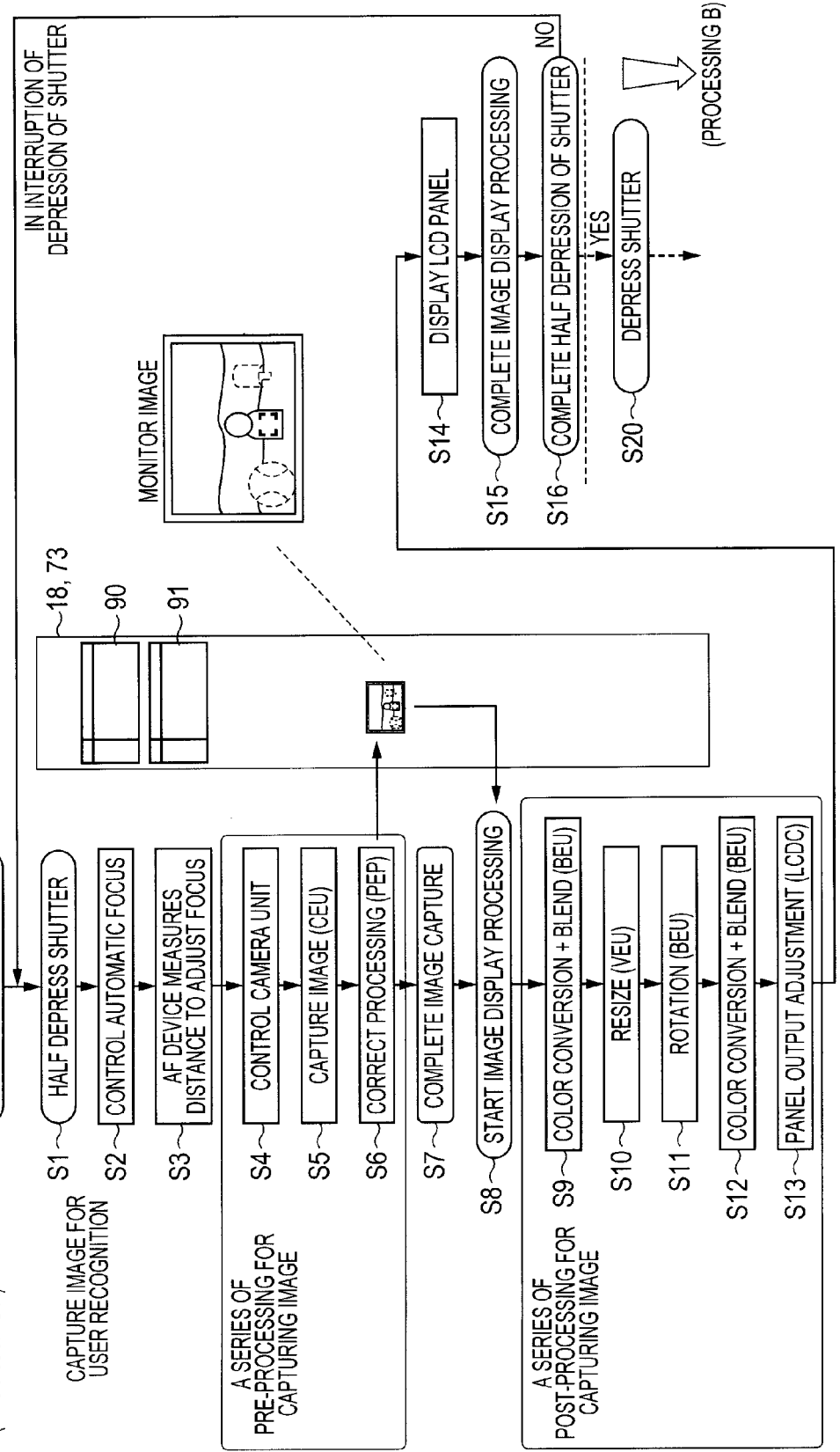
FIG. 9 is a flow chart showing an example of a detailed procedure for performing the processing A.

FIG. 9 shows an example of a detailed procedure for performing the processing A. When the shutter button BTN is depressed halfway (middle depression) (S1), the camera unit 10 starts the AF control (S2) to perform a processing in which a distance to a subject in a focus area is measured to match the focal length of an optical system to the measured distance (S3). When the focal length of the optical system is determined, the camera unit 10 captures a monitor image (S5), data of the captured monitor image are input to the capture circuit 78, and the correction circuit 80 subjects the input monitor image to a required camera-shake correction (S6) and the input monitor image subjected thereto is stored in the work memory 73 (S7). The display processing for the data of the monitor image stored in the work memory 73 is started (S8). A color conversion and blend processing by the blend processing circuit 82 (S9), an image resize change processing by the resize circuit 83 (S10), an image rotation processing by the rotation processing circuit 81 (S11), another color conversion and blend processing such as remaining battery capacity by the blend processing circuit 82 (S12), and the output adjustment of the liquid crystal display panel 11 by the liquid crystal display control circuit 79 are performed as required according to the option designation of a preset display pattern. The image data subjected to the above processing are displayed on the liquid crystal display panel (LCD) 11 (S14) and the display processing of the monitor mage is completed (S15). A photographer confirms a display state. If the state is unsatisfactory, the state of the middle depression in which the shutter button BTN is depressed halfway is released to allow performing again the processing from step S1. If the state is satisfactory, the shutter button BTN is fully depressed (S20) to start the following processing B and the monitor image is captured.

Figure 10:
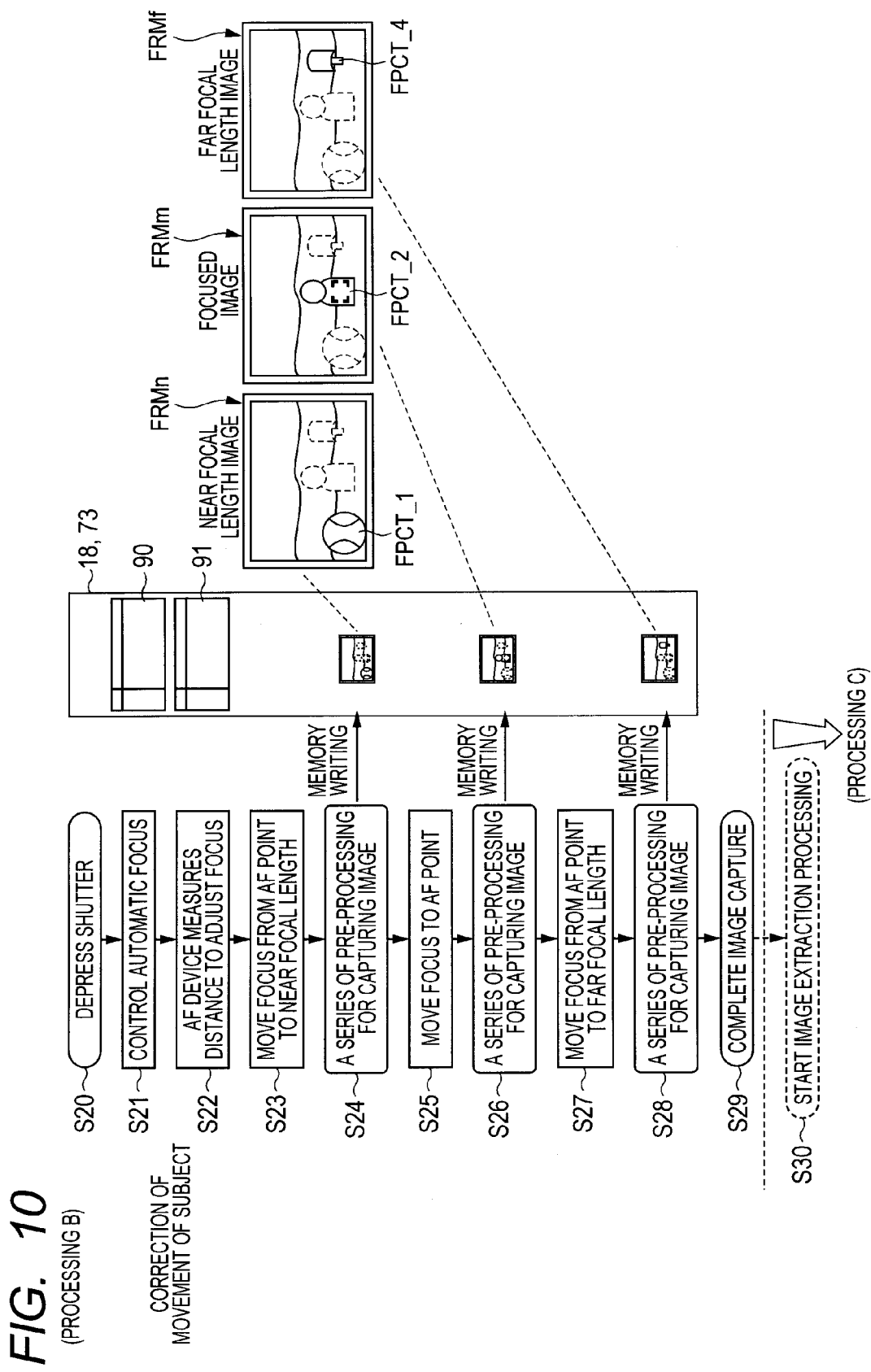
FIG. 10 is a flow chart showing an example of a detailed procedure for performing the processing B.

FIG. 10 shows an example of a detailed procedure for performing the processing B. The shutter button BTN is fully depressed (S20) to cause the camera unit 10 start again the AF control for correcting the movement of a subject (S21), performing a processing in which a distance to the subject in a focus area is measured to match the focal length of an optical system to the measured distance (S22). When the focal length of the optical system is determined, the focal length of the optical system is changed from the determined distance to the near distance (S23), the near image FRMn is captured, and the data thereof is stored in the buffer memory 73 (S24). The processing in step S24 corresponds to that in steps S4 to S6 in FIG. 9. The focal length of the optical system is changed to the distance determined by the AF control (S25), the focus image FRMm is captured, and the data thereof is stored in the buffer memory 73 (S26). The processing in step S26 corresponds to that in steps S4 to S6 in FIG. 9. The focal length of the optical system is changed from the determined distance to the far distance (S27), the far image FRMf is captured, and the data thereof is stored in the buffer memory 73 (S28). Thereby, three captured image data of the near image FRMn, the focus image FRMm, and the far image FRMf in which the focal length is changed at the distance measured by the AF control, which is taken as the center, and at the distances before and after the measured distance are stored in the work memory 73.

In particular, as shown in step S23 to step S27, an operation direction in which the camera unit 10 performs focusing can be limited to one direction because the order of capturing the plurality of data with the focal length changed is controlled in the following order of a proximity position (vicinity position), the AF focus position (center position), the far position (distant-view position). Therefore, the operation direction does not need to be reciprocal unlike the case where the camera unit performs focusing with the AF focus position as a reference point. This permits increasing the speed and the stability of the operation for acquiring the plurality of data captured with the focal length changed.

Figure 11:
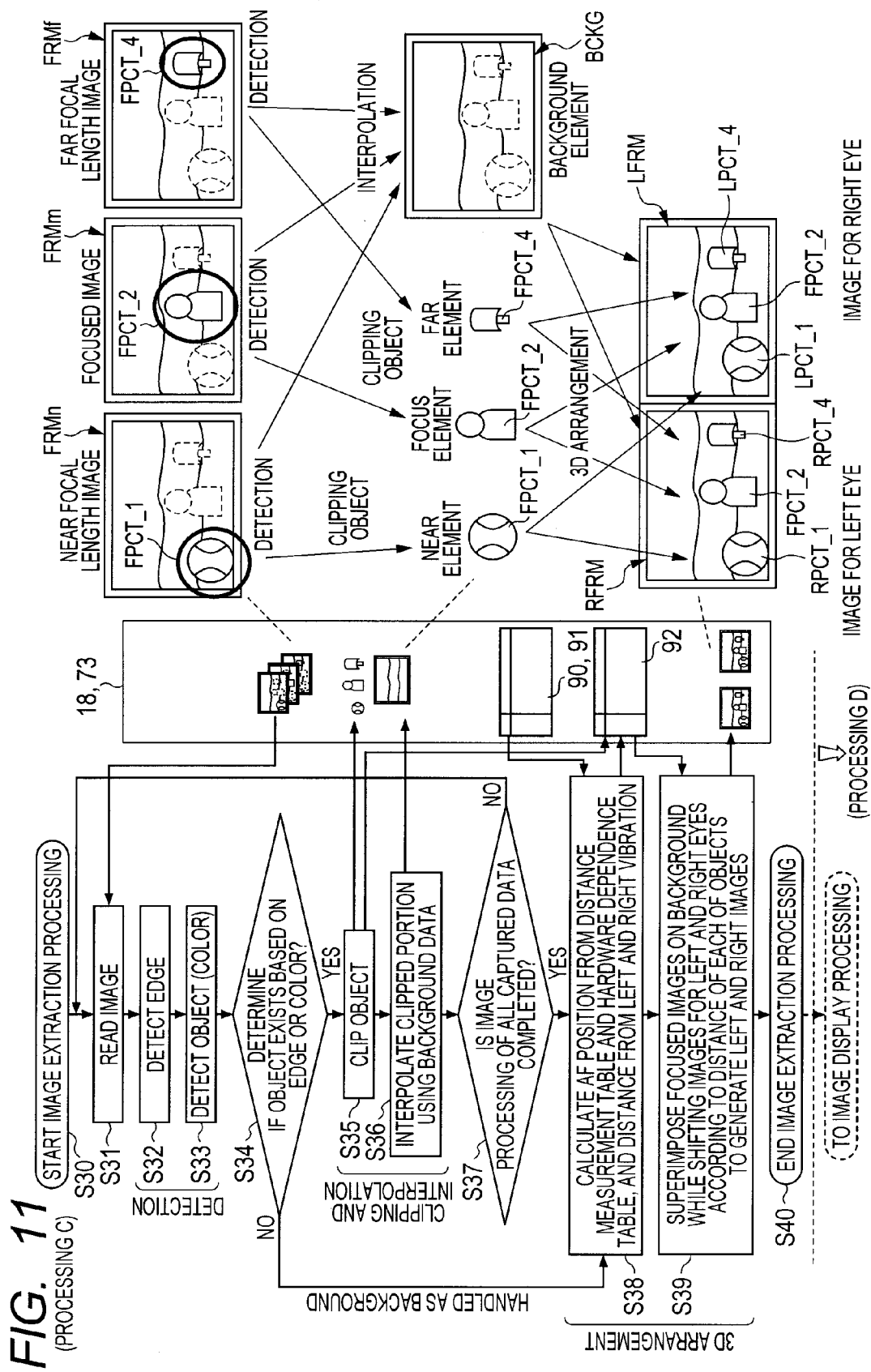
FIG. 11 is a flow chart showing an example of a detailed procedure for performing the processing C.

FIG. 11 shows an example of a detailed procedure for performing the processing C. When the image extraction processing is started (S30), one of the three two-dimensional captured image data of the far image FRMf, the near image FRMn, and the focus image FRMm which are previously acquired is read (S31), the read image data are subjected to the edge detection (S32) and the color and the contrast detection (S33), and a determination is made as to whether the image of an object exists based on the detected edge and color (S34). For example, if it is determined that the image of an object exists in an area surrounded by an edge or in a color boundary high in color contrast, the data of the area in which the image of an object exists are clipped (S35). The detection strength of the edge and the contrast is changed in the determination of an object to discriminate the focused image from the non-focused image. The background data left after the focused and non-focused images are clipped as the images of the object are subjected to an interpolation processing using the background data of the clipped portion (S36). All captured image data are subjected to the processing from steps S31 to S36 (S37). The extracted image data are stored in a work table 92.

The focal lengths of data of the near element FPCT_1 and the far element FPCT_4 being the focused images of image data stored in the work table 92 are calculate using the actual distance conversion table 90. Furthermore, the near element FPCT_1 and the far element FPCT_4 are subjected to a processing for obtaining the amount of displacement of arrangement in images for the left and right eyes for the three-dimensional display from the arrangement displacement-amount conversion table 91 based on the above calculated focal lengths (S38).

Figure 12:
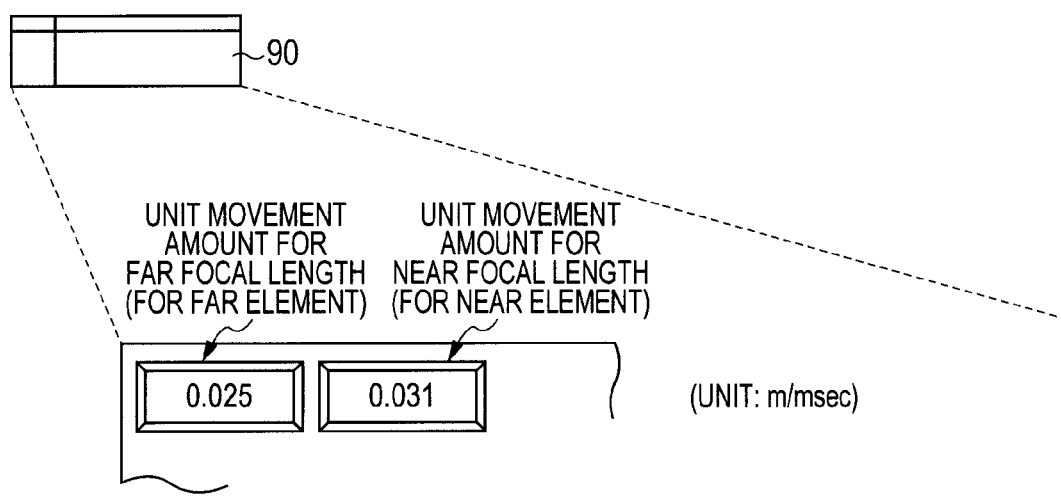
FIG. 12 is a schematic diagram exemplifying an actual distance conversion table.

As shown in FIG. 12, for example, the actual distance conversion table 90 stores 0.025 m/msec being the amount of change to a far direction in the focal length corresponding to unit amount of movement (unit drive time) of the optical system of the camera unit 10 to a far direction and 0.031 m/msec being the amount of change to a near direction in the focal length corresponding to unit amount of movement (unit drive time) of the optical system of the camera unit 10 to a near direction. The unit amount of movement is not limited to the unit drive time.

Figure 13:
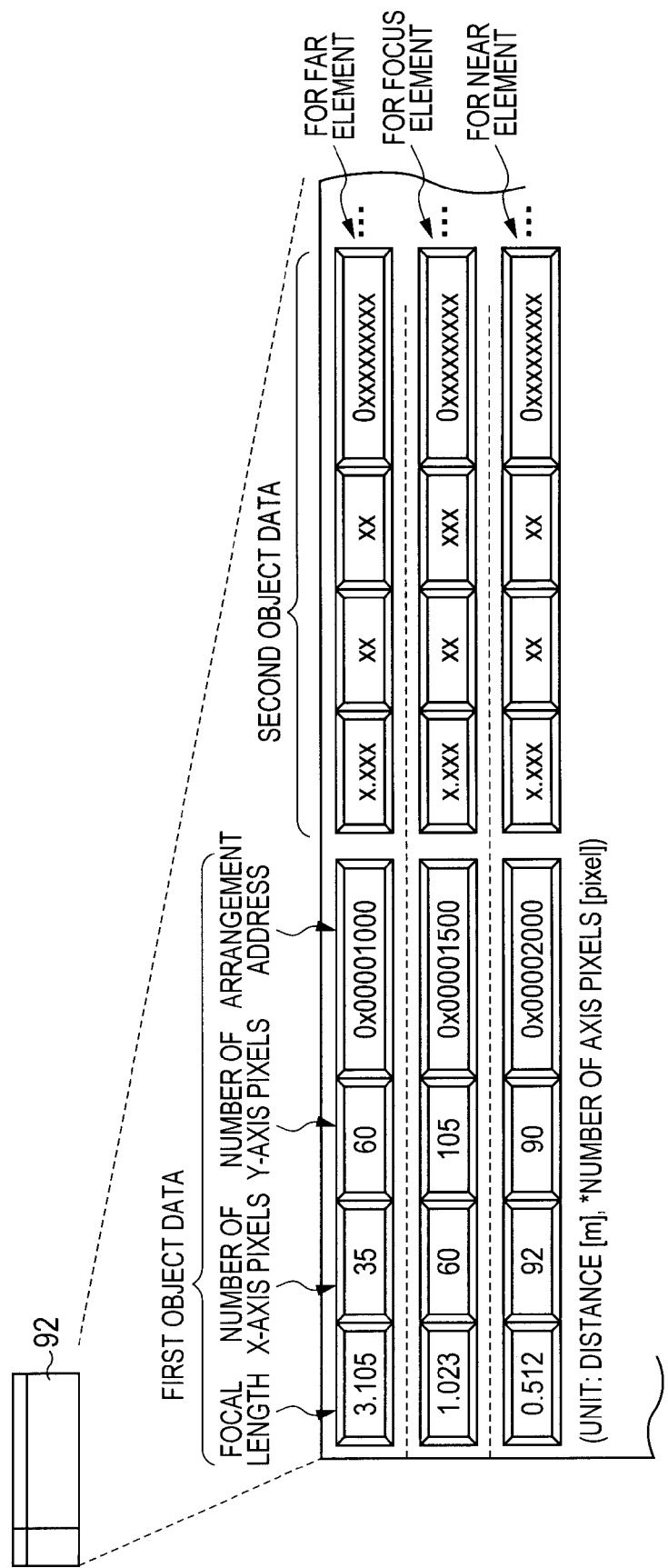
FIG. 13 is a table for describing a work table.

As shown in FIG. 13, the work table 92 has a focal length (unit in meter), an image size (the number of pixels on X and Y axes), and an arrangement address (buffer memory address) of a focused image on a bit map of captured data for each object of the focused image determined to exist in step S34, i.e., for each image element. Although not illustrated in the figure, the amount of displacement of arrangement obtained from the arrangement displacement-amount conversion table 91 is stored in a storage area for the far element and a storage area for the near element in the work table 92.

In step S39 in FIG. 11, data of the right- and left-eye images RFRM and LFRM are generated such that the focus element FPCT_2 is mapped onto an arrangement address position on the background image and the near and far elements FPCT_1 and FPCT_4 are mapped onto a position displaced by the amount of displacement of arrangement with respect to their respective arrangement addresses using data stored in the work table 92 in step S38. The data of the right- and left-eye images RFRM and LFRM are stored in a frame buffer (not illustrated) on the work memory 73. Thereby, the image extraction processing is completed (S40).

Figure 14:
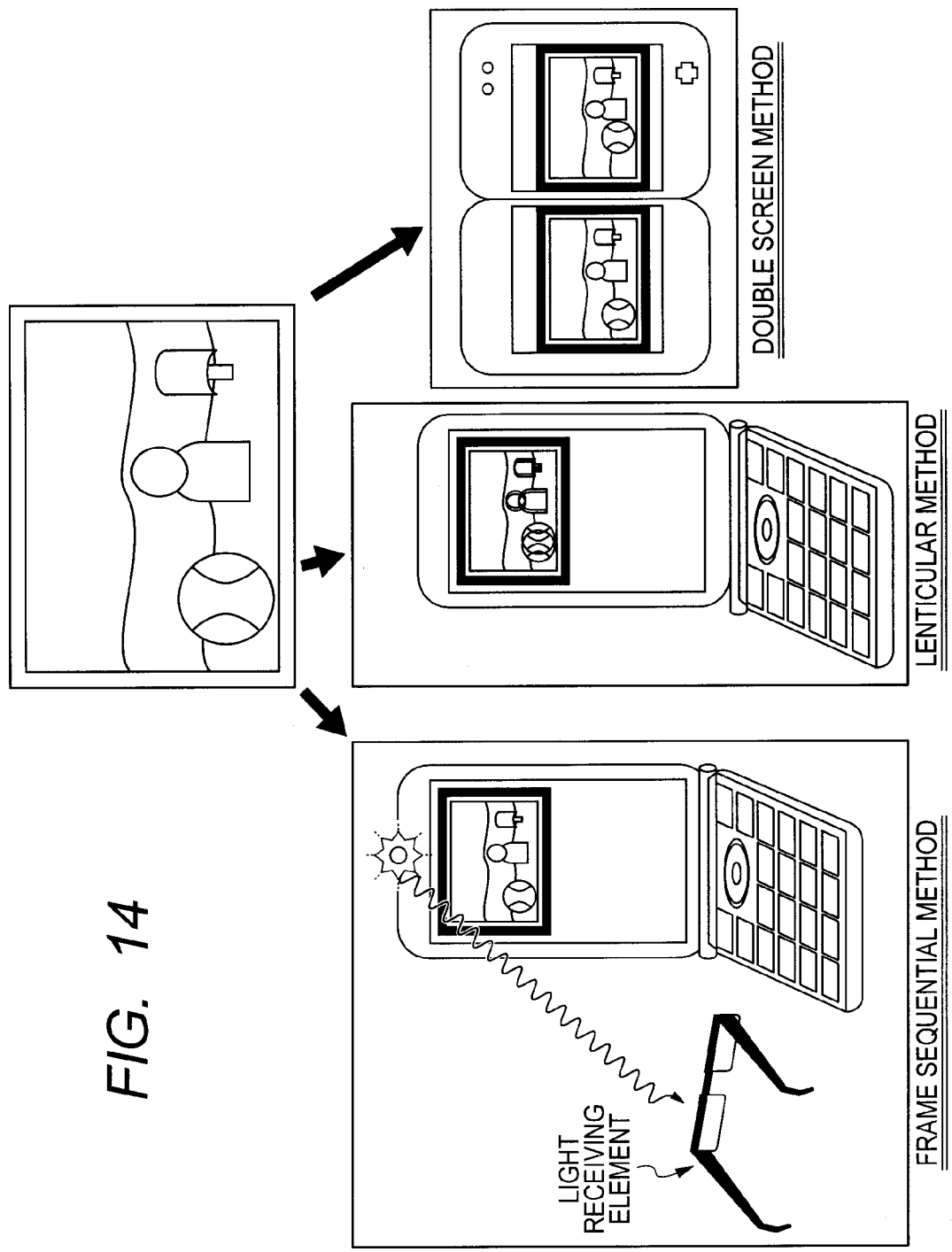
FIG. 14 is a schematic diagram showing the outline of a frame sequential method, a lenticular method, and a double screen method as the three-dimensional image display method.

A detailed image display in the processing D is different according to the three-dimensional image display method. The three-dimensional display method includes a frame sequential method, a lenticular method, and a double screen method which are exemplified in FIG. 14. The frame sequential method enables a three-dimensional image to be recognized such that the right- and left-eye images are alternately switched and displayed and right- and left-eye shutters for eyeglasses are turned on and off by a switching signal synchronized with the switching in synchronization with a screen display. The lenticular method is such that a pattern is changed according to a view angle or a stereoscopic effect can be obtained using a sheet-like lenticular lens. A lenticular image using the lenticular method is the one that two or more images are cut into a strip shape and the cut images are arranged in order in an interlaced form to create one image. One convex lens needs to be correspondingly placed on each stripe of the images. The double screen method provides a stereoscopic effect such that the right- and left-eye images are displayed in parallel on two displays to cause a viewer to view two screens as if the screens are superimposed.

Figure 15:
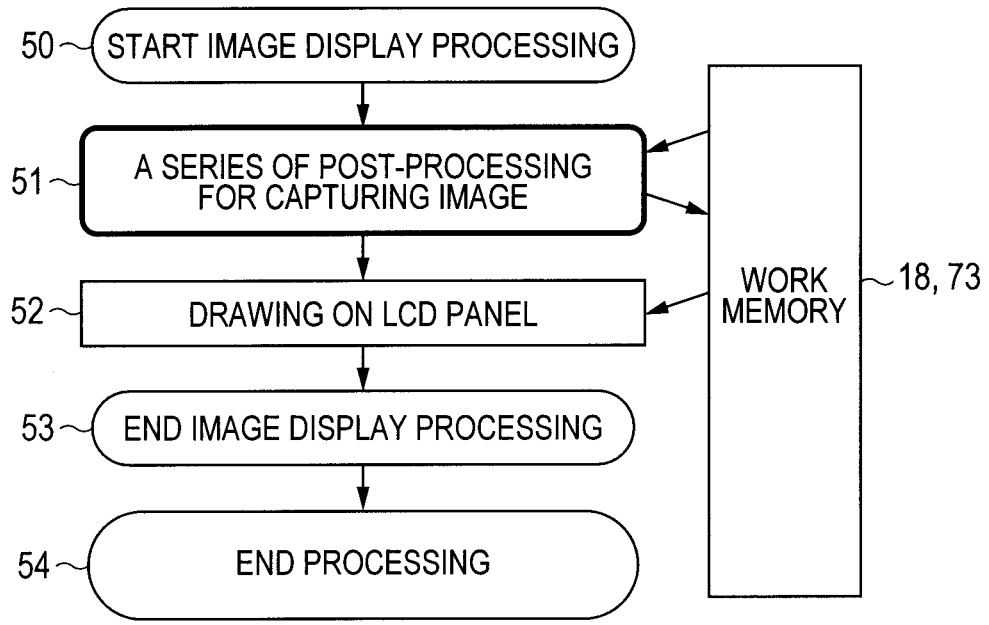
FIG. 15 is a flow chart showing an example of a detailed procedure for performing the processing D corresponding to the double screen method.

FIG. 15 shows an example of a detailed procedure for performing the processing D corresponding to the double screen method. When the image display processing is designated (S50), data of the left- and right-eye images LFRM and RFRM are read from the work memory 73 to perform the image processing for display (S51) and display processing on the liquid crystal display 11 (S52). The processing corresponding to that in steps S9 to S13 described in FIG. 9 is performed in the image processing for display in S51. The display processing is completed (S53) to end the processing for a series of three-dimensional displays (S54).

Figure 16:
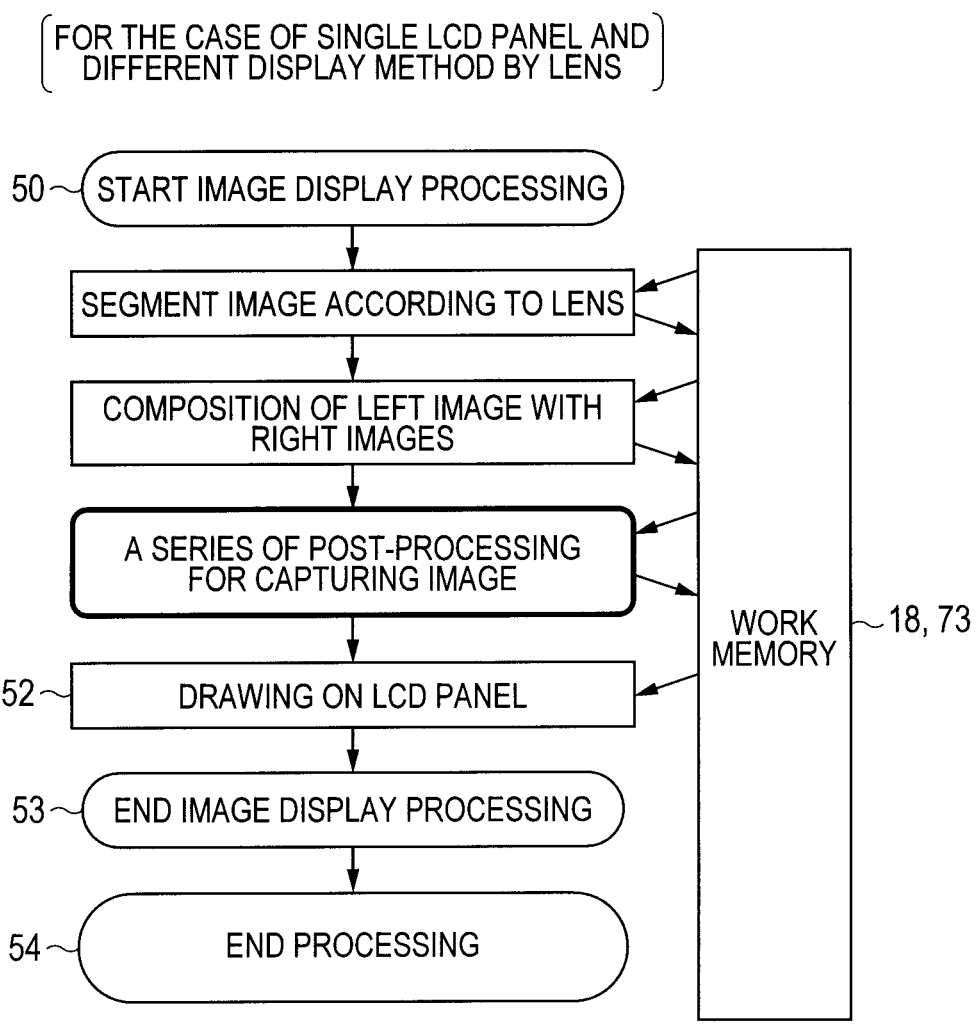
FIG. 16 is a flow chart showing an example of a detailed procedure for performing the processing D corresponding to the lenticular method.

FIG. 16 shows an example of a detailed procedure for performing the processing D corresponding to the lenticular method. When the image display processing is designated (S50), data of the left- and right-eye images LFRM and RFRM in the work memory 73 are matched with the width of a lenticular range and cut into a strip shape (S60), the cut left and right data are alternately combined with each other to generate lenticular correspondence image data (S61). The lenticular correspondence image data are read from the work memory 73, subjected to the image processing for display (S62), and displayed on the liquid crystal display panel 11 (S52). The processing corresponding to that in steps S10, S11, and S13 described in FIG. 9 is performed in the image processing for display in step S62. The display processing is completed (S53) to end the processing for a series of three-dimensional displays (S54).

According to a first embodiment described above, since each of the plurality of data captured with a focal length changed is different in a focused image according to the focal length, each focused image is combined with a background image with a distance to the focused image different according to the focal length reflected in the depth of the three-dimensional display to allow generating data of three-dimensional display images for the right and left eyes from the plurality of data captured with a focal length changed according to instructions as to imaging operation. Since the focused image is different from a non-focused image in degree of detection of an image boundary, an image can be detected or extracted according to the degree of detection, which eliminates the need for employing the processing for recognizing an image by a method such as a pattern matching such that the feature and contour of the image to be detected is previously registered, this simplifies the three-dimensional data processing, and data and program capacity do not need to be increased. Furthermore, neither a plurality of camera units needs to be prepared nor a complicated mechanical structure and a positioning control mechanism which are used as a swing positioning mechanism in the camera unit are required.

Second Embodiment

Figure 17:
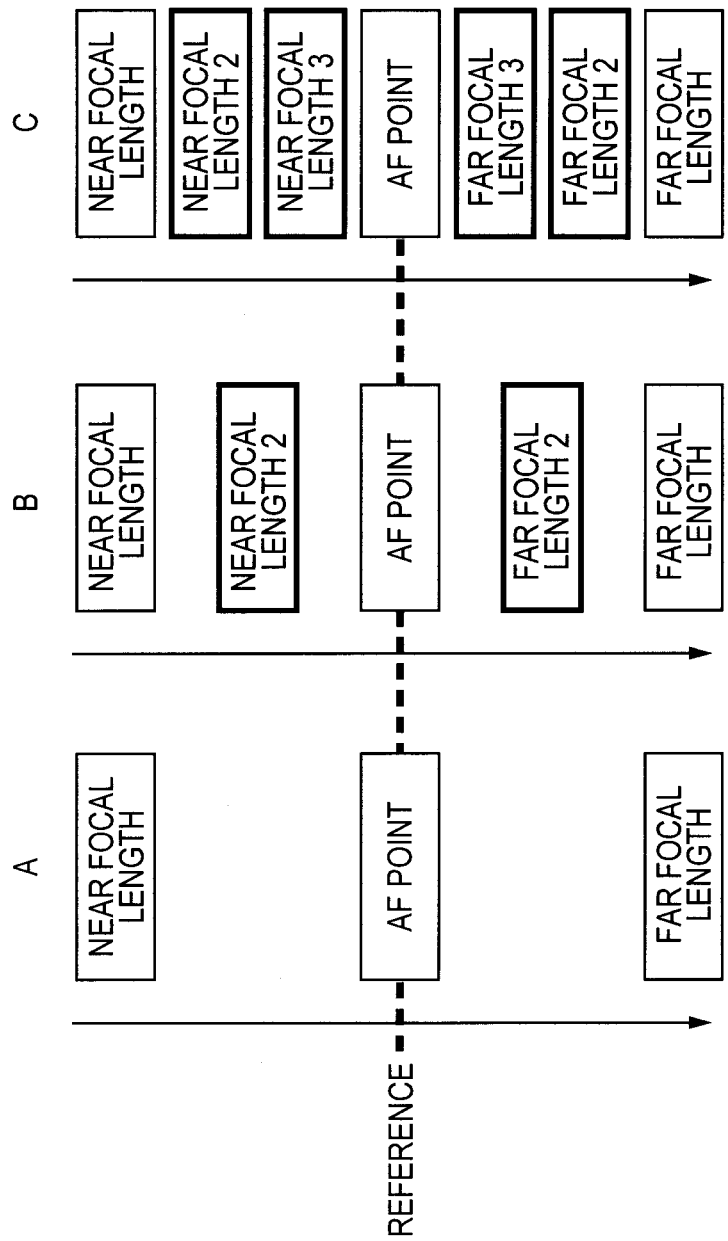
FIG. 17 is a schematic diagram describing a second embodiment in which a plurality of near and far focal lengths are provided with respect to the AF point.

In the first embodiment, as described in FIG. 1, captured data to be subjected to the three-dimensional display data processing are the ones that the focal length is changed to three positions of the near, middle, and far focal lengths. More specifically, as illustrated in A in FIG. 17, with the focal length (AF point) acquired by the AF control as a center, a near focal length which is near to the camera unit by a predetermined focal length with respect to the center, the center focal length, and a far focal length which is far from the center by a predetermined focal length are used. The second embodiment is different from the first embodiment in that the focal length is changed to the number of times of capturing images. As shown in B and C in FIG. 17, predetermined focal lengths near to the center (AGF point) are taken as a plurality of focal lengths and predetermined focal lengths far from the center (AGF point) are taken as a plurality of focal lengths. The second embodiment other than those above is similar to the first embodiment, so that the detailed description thereof is omitted herein.

The increase of the number of types of near and far focal lengths increases three-dimensional data processing time, however, the presence of a three-dimensional image can be enhanced. On the other hand, the decrease of the number of types of near and far focal lengths reduces the presence of a three-dimensional image, however, the three-dimensional data processing time can be reduced.

Third Embodiment

In the third embodiment, an object moving at a high speed, in particular, is taken as a subject. The high speed presumed herein refers to a moving speed comparing with a speed at which a focal length is changed by an optical system when the focal length is changed to acquire a plurality of captured data required for the three-dimensional data processing. In short, if such a subject is captured with the focal length extended in the same direction as the direction at which the subject is moved, the subject on which a camera is focused is obtained in any captured screen, so that this problem is tackled. When the same focused images compete with each other among a plurality of image data, the same focused images are acquired as the high speed moving object to solve the problem. For example, as shown in A in FIG. 18, if a moving object MVO moves at a high speed from the forward to the backward direction in the focal depth, any of the near focused image, the AF point focused image, and the far focused image may be used as the focused image of the moving object MVO, from the viewpoint of stereoscopic vision, however, the captured data whose focal length is shortest in the competing focused images, in other words, the near focused image is combined with the background image. A determination as to whether a focused image competes can be made based not only on the congruence, but also on the similarity of an image shape extracted from captured image data.

Figure 18:
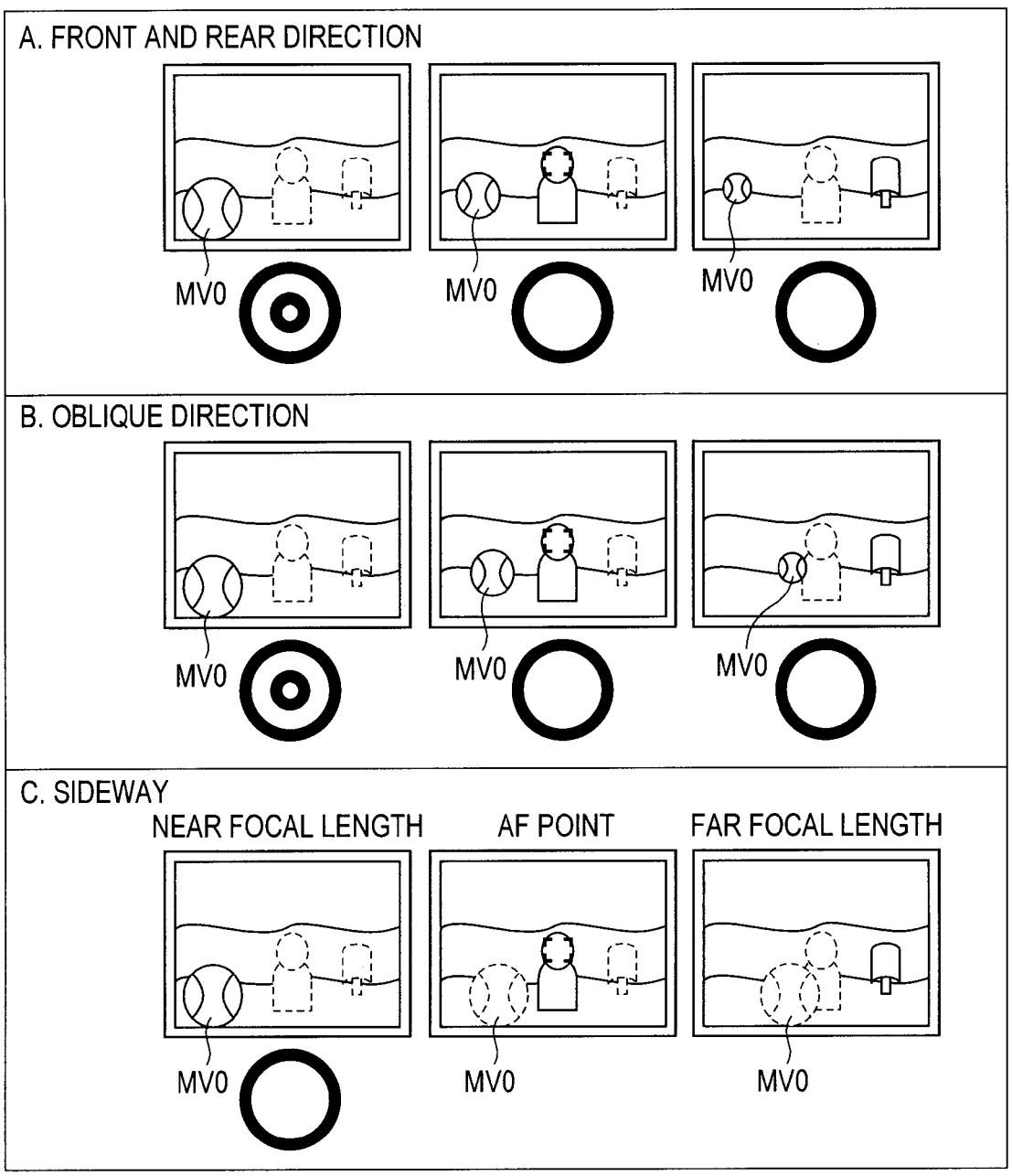
FIG. 18 is a schematic diagram describing a third embodiment in which an object moving at a high speed is taken as a subject.

As shown in B in FIG. 18, in a case where a moving object which obliquely moves at a high speed to a depth direction with respect to the direction of focal depth is taken as one object, and if the same focus images compete, the processing similar to that in A in FIG. 18 may be performed.

As shown in C in FIG. 18, if the high-speed moving object MVO traverses, focus images compete do not compete theoretically, so that high-speed movement does not need to be taken into consideration and one focused image has only to be used. If focus images compete with each other due to some reason, the image data whose focal length is shortest is used to perform the processing.

According to the third embodiment, the object moving to the direction at which the focal length of the captured data is changed probably becomes a focused image in each of a plurality of data captured with a focal length changed. In such a state, focused images compete with each other among the plurality of captured data, and one of the competing focused images is selected and needs to be combined with a background image. At this point, the focused image of captured data whose focal length is shortest is selected to allow a moving object to be three-dimensionally displayed so that the moving object can be prominently projected from the front.

Fourth Embodiment

The concept of the present invention is applicable to not only a still image, but also a moving image. Since the moving image is formed of a plurality of frames of still images, the concept may be applied with each frame associated with the image data at the FA point. Frame data at the near and the far focal length for stereoscopic vision before and after each frame are acquired and the processing for extracting the above focused images and combining the background image therewith is performed to generate data for the display frame.

Figure 19:
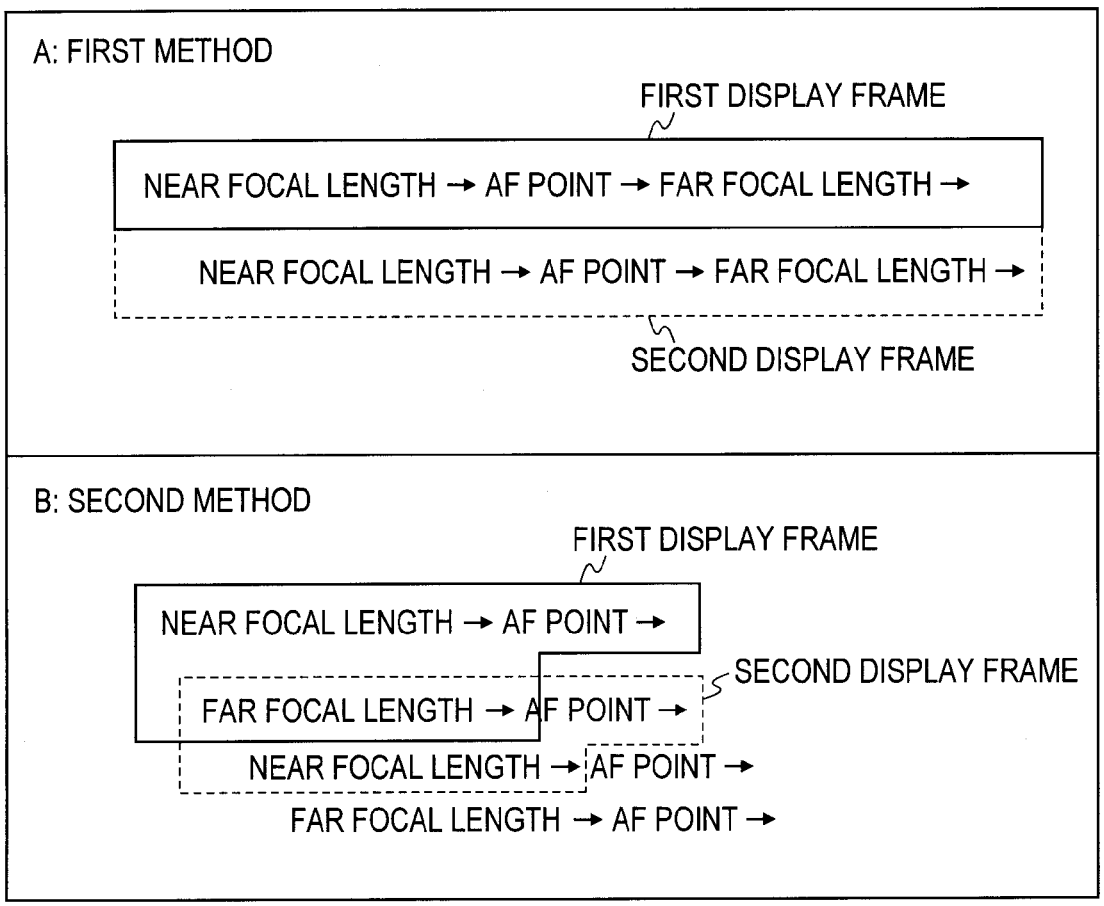
FIG. 19 is a schematic diagram describing a fourth embodiment in which the concept of the present invention is applied not only to a still image but also to a moving image.

For example, as shown in A in FIG. 19, the near and the far distance frame data are acquired before and after the AF point for each frame to allow obtaining a plurality of data captured with a focal length changed. The sequence similar to that for case of a still image has only to be repeated, so that the processing is simple and can be easily optimized.

On the other hand, a moving image is high in correlation between the front and rear frames, so that the frame, data with a near focal length (or a far focal length) are appropriated to the frame data with a near focal length (or a far focal length) of the neighboring frame in the range high in correlation to acquire frame data with the near and the far focal length for stereoscopic vision before and after each frame. For example, for a first frame, captured data with the near focal length and the AF point are acquired. For a second frame, captured data with the far focal length and the AF point are acquired. For a third frame, captured data with the near focal length and the AF point are acquired. In this case, the stereoscopic-vision display frame for the first frame is generated by using the captured data with the near focal length and the AF point related to the first frame and the captured data with the far focal length related to the second frame. Similarly, the stereoscopic-vision display frame for the second frame is generated by using the captured data with the far focal length and the AF point related to the second frame and the captured data with the near focal length related to the third frame. A method B in FIG. 19 can make the time for acquiring captured data shorter than a method A and reduce a use memory capacity. For this reason, the method B is excellent in a high speed processing and a low power consumption and suited for capturing a moving image from the viewpoint of real-time capability.

The fourth embodiment other than those above is also applicable to a portable apparatus as is the case with the first embodiment, so that the detailed description thereof is omitted herein.

Fifth Embodiment

Figure 20:
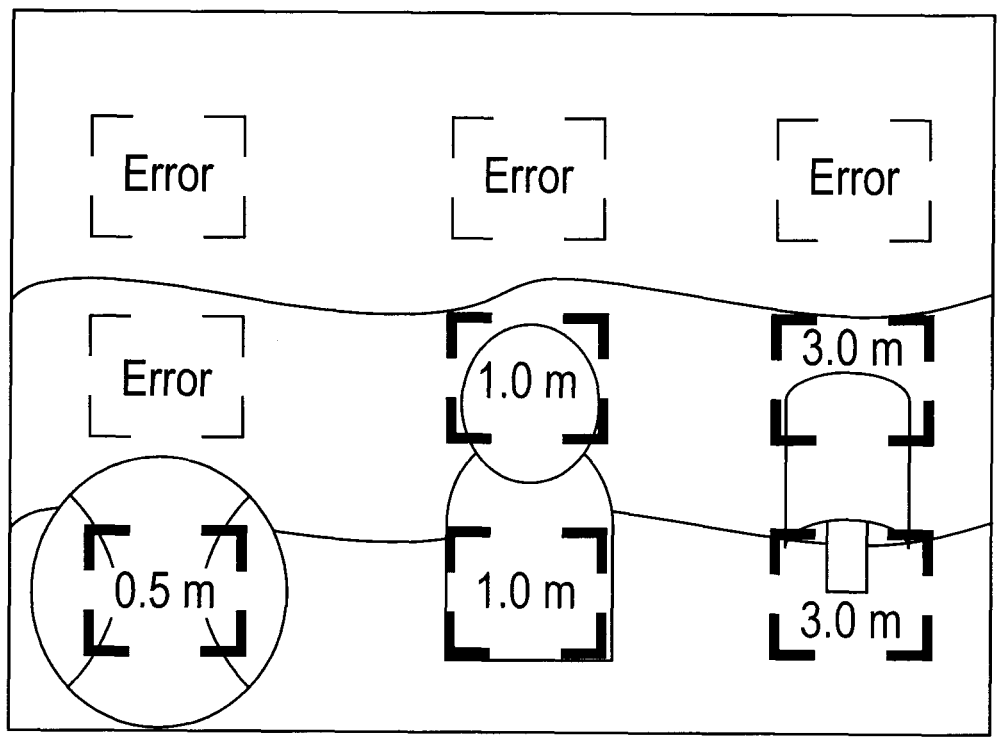
FIG. 20 is a schematic diagram describing a fifth embodiment in which a division AF control function is used that a distance measuring area is divided into nine parts to perform measurement for each divided area in the measurement of a distance at the AF point.
Figure 21:
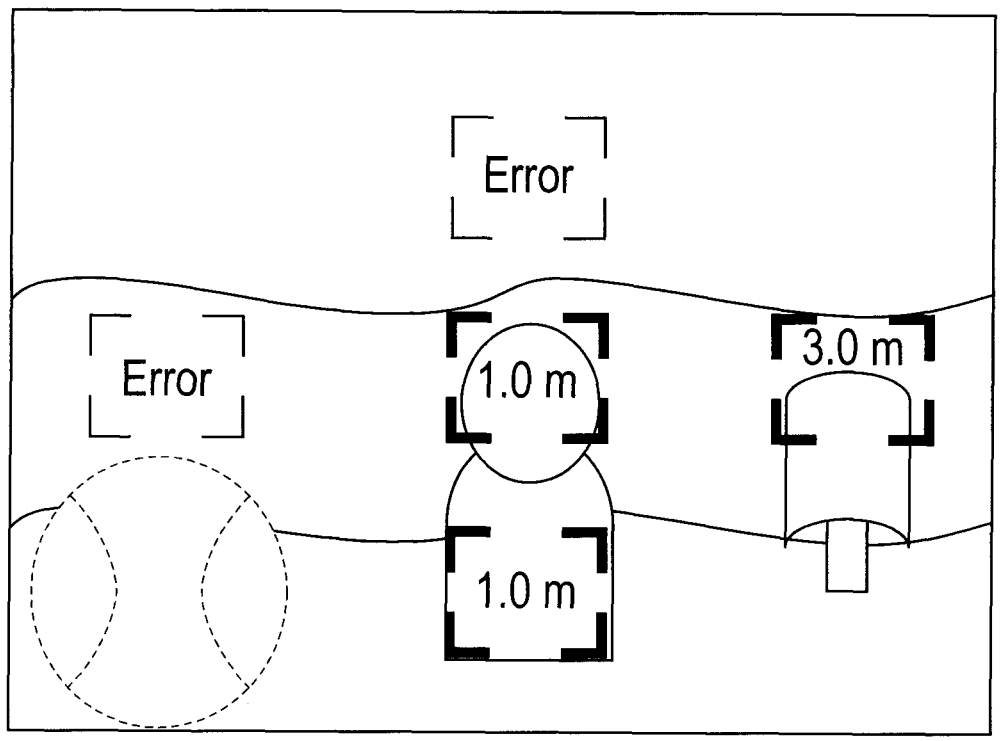
FIG. 21 is another schematic diagram describing a fifth embodiment in which a division AF control function is used that a distance measuring area is divided into five parts to perform measurement for each divided area in the measurement of a distance at the AF point.

A distance at the AF point may be measured by using together a division AF control function in which a distance measuring area is divided to perform measurement for each divided area. As shown in FIG. 20, the entire distance-measuring area in a capturing area is divided into nine parts and the amount of displacement of arrangement for the focused image of the subject whose distance can be measured may be calculated using the focal length obtained thereby. As shown in FIG. 21, the center portion of the distance-measuring area in the capturing area is divided into five parts and the amount of displacement of arrangement for the focused image of the subject whose distance can be measured may be calculated using the focal length obtained thereby. The amount of displacement of arrangement for the focused image of the subject whose distance cannot be measured may be calculated using the method described in the first embodiment.

The fifth embodiment other than those above is similar to the first embodiment, so that the detailed description thereof is omitted herein.

Although the invention made by the inventors are described above in detail based on the embodiments, it is to be understood that the present invention is not limited to the embodiments, but various modifications may be made without departing from the scope of the invention.

For example, the AF control using contrast may be used instead of the AF control using phase detection. The contrast AF is a method in which a position high in contrast is found while a focus lens is being moved based on an image captured by an image sensor and a camera is focused on the position.

The microcomputer and the SDRAM are not limited to an individually packaged semiconductor device, but may be packaged in a single module as a package on package (POP) system in package (SiP) or in a single LSI as a system on a chip (SoC).

The present invention is widely applicable not only to personal digital assistant (PDA) typified by a cellular phone and a smart phone but also to a portable apparatus with an imaging function such as a digital still camera and a video camera.

What is claimed is:

1. A portable apparatus comprising:
a camera unit;
an operation unit; and
a data processing unit,
wherein the data processing unit performs processing for causing the camera unit to acquire a plurality of data captured with a focal length changed in response to instructions for imaging operation by the operation unit and generating three-dimensional display data from the captured data based on the correlation of focused images which are different according to the focal lengths of the acquired plurality of captured data with the focal length thereof, and
wherein non-focused images are deleted and focused images are extracted from the captured data based on a degree of detection of an image boundary.

2. A portable apparatus comprising:
a camera unit;
an operation unit;
a data processing unit for controlling the camera unit based on the operation of the operation unit and processing data captured by the camera unit; and
a display unit for performing three-dimensional display using image data generated by the data processing unit,
wherein the data processing unit causes the camera unit to acquire a plurality of data captured with a focal length changed in response to instructions for imaging operation by the operation unit, discriminates data of focused images, data of non-focused images corresponding to the focused images, and data of a background image from which the focused images and the non-focused images are removed, from the acquired plurality of captured data, and generates data of three-dimensional display images for the right and left eyes in which each of the focused images is combined with the background image with the focal length corresponding to the focused image reflected in the depth of the three-dimensional display.

3. The portable apparatus according to claim 2, wherein the data processing unit performs an edge detection and a color difference detection to take an image having a boundary high in detection rate as a focused image and an image having a boundary low in detection rate as a non-focused image.

4. The portable apparatus according to claim 2, wherein, with the focal length designated by the operation of the operation unit as a center, the data processing unit instructs the camera unit to capture an image at a near focal length which is near to the camera unit by a predetermined focal length with respect to the center, at the center focal length, and at a far focal length which is far from the center by a predetermined focal length.

5. The portable apparatus according to claim 4, wherein the predetermined near focal length with respect to the center is a single or a plurality of focal lengths and the predetermined far focal length with respect to the center is a single or a plurality of focal lengths.

6. The portable apparatus according to claim 4, wherein the data processing unit captures a plurality of data with the focal length changed in the order of the near-, the center-, and the far-focal length.

7. The portable apparatus according to claim 2, wherein the data processing unit includes a lookup table of an actual distance according to the amount of movement, which stores correspondence between the amount of movement in which the focus of focus position of the camera unit is moved and the actual distance, and acquires the focal length except the reference point related to the captured data acquired with the focal length changed based on the actual distance acquired from the lookup table based on the amount of movement of a focus with respect to the focus position of the reference point and the focal length of the focus position of the reference point when an image is captured with the focal length changed with the focus position as the reference point.

8. The portable apparatus according to claim 7, wherein the data processing unit includes a lookup table of the amount of displacement of arrangement according to the focal length, which stores the correspondence of the amount of displacement of arrangement of a focused image in the left- and right-eye images with the focal length to determine a depth in which the focal length is reflected, and determines the arrangement of the focused images in the left- and right-eye images with reference to the lookup table according to the focal length.

9. The portable apparatus according to claim 2, wherein, when the focused images compete among a plurality of captured image data, the data processing unit combines, with the background image, the focused image of the captured data in which the focal length is shortest in the competing focused images.

10. A portable apparatus comprising:
a camera unit;
an operation unit;
a data processing unit for controlling the camera unit based on the operation of the operation unit and processing data captured by the camera unit; and
a display unit for performing three-dimensional display using image data generated by the data processing unit,
wherein the data processing unit causes the camera unit to acquire a plurality of data captured with a focal length changed in response to instructions for imaging operation by the operation unit, discriminates data of focused images, data of non-focused images corresponding to the focused images, and data of a background image from which the focused images and the non-focused images are removed, from the acquired plurality of captured data, and generates data of three-dimensional display images for the right and left eyes in which each of the focused images is combined with the background image with the focal length corresponding to the focused image reflected in the amount of displacement of arrangement for the three-dimensional display of the focused image.

11. The portable apparatus according to claim 10, wherein the data processing unit performs an edge detection and a color difference detection to take an image having a boundary high in detection rate as a focused image and an image having a boundary low in detection rate as a non-focused image.

12. The portable apparatus according to claim 10, wherein, with the focal length designated by the operation of the operation unit as a center, the data processing unit instructs the camera unit to capture an image at a near focal length which is near to the camera unit by a predetermined focal length with respect to the center, at the center focal length, and at a far focal length which is far from the center by a predetermined focal length.

13. The portable apparatus according to claim 12, wherein the predetermined near focal length with respect to the center is a single or a plurality of focal lengths and the predetermined far focal length with respect to the center is a single or a plurality of focal lengths.

14. The portable apparatus according to claim 12, wherein the data processing unit captures a plurality of data with the focal length changed in the order of the near-, the center-, and the far-focal length.

15. The portable apparatus according to claim 10, wherein the data processing unit includes a lookup table of an actual distance according to the amount of movement, which stores correspondence between the amount of movement in which the focus of focus position of the camera unit is moved and the actual distance, and acquires the focal length except the reference point related to the captured data acquired with the focal length changed based on the actual distance acquired from the lookup table based on the amount of movement of a focus with respect to the focus position of the reference point and the focal length of the focus position of the reference point when an image is captured with the focal length changed with the focus position as the reference point.

16. The portable apparatus according to claim 15, wherein the data processing unit includes a lookup table of the amount of displacement of arrangement according to the focal length, which stores the correspondence of the amount of displacement of arrangement of a focused image in the left- and right-eye images with the focal length to determine the amount of displacement of arrangement for the three-dimensional display of the focused image, and determines the arrangement of the focused images in the left- and right-eye images with reference to the lookup table according to the focal length.

17. The portable apparatus according to claim 10, wherein, when the focused images compete among a plurality of captured image data, the data processing unit combines the focused image of the captured data in which the focal length is shortest in the competing focused images with the background image.

18. A microcomputer comprising:
a plurality of camera interfaces which output control to a camera unit and which input captured data;
an input interface which inputs operation instructions to the camera unit; and
a plurality of program processing units which generate the control output to the camera unit based on the input operation instructions and which perform data processing of the captured data input from the camera interfaces,
wherein each said program processing unit performs processing for acquiring a plurality of data captured with a focal length changed from the camera interface in response to the operation instructions from the input interface and generates three-dimensional display data from the captured data based on the correlation of focused images which are different according to the focal lengths of the acquired plurality of captured data with the focal length thereof, and
wherein non-focused images are deleted and focused images are extracted, from the captured data based on a degree of detection of an image boundary.

19. A microcomputer comprising:
Camera interfaces for outputting control to the camera unit and inputting captured data;
an input interface for inputting operation instructions to the camera unit; and
program processing units for generating the control output to the camera unit based on the input operation instructions and subjecting the captured data input from the camera interfaces to data processing,
wherein the program processing unit acquires a plurality of data captured with a focal length changed from the camera interface in response to the operation instructions from the input interface, discriminates data of focused images, data of non-focused images corresponding to the focused images, and data of a background image from which the focused images and the non-focused images are removed, from the acquired plurality of captured data, and generates data of three-dimensional display images for the right and left eyes in which each of the focused images is combined with the background image with the focal length corresponding to the focused image reflected in the depth of the three-dimensional display.

20. A microcomputer comprising:
camera interfaces for outputting control to the camera unit and inputting captured data;
an input interface for inputting operation instructions to the camera unit; and
program processing units for generating the control output to the camera unit based on the input operation instructions and subjecting the captured data input from the camera interfaces to data processing,
wherein the program processing unit acquires a plurality of data captured with a focal length changed from the camera interface in response to the operation instructions from the input interface, discriminates data of focused images, data of non-focused images corresponding to the focused images, and data of a background image from which the focused images and the non-focused images are removed, from the acquired plurality of captured data, and generates data of three-dimensional display images for the right and left eyes in which each of the focused images is combined with the background image with the focal length corresponding to the focused image reflected in the amount of displacement of arrangement for the three-dimensional display of the focused image.

* * * * *